(12) United States Patent
Celia

(10) Patent No.: US 9,097,530 B2
(45) Date of Patent: Aug. 4, 2015

(54) METHOD FOR ENSURING CONTINUITY OF SERVICE OF A PERSONAL NAVIGATION DEVICE AND DEVICE THEREOF

(75) Inventor: Saverio Celia, Rivalta di Torino (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 0 days.

(21) Appl. No.: 14/131,338

(22) PCT Filed: Jul. 27, 2012

(86) PCT No.: PCT/IB2012/053863
§ 371 (c)(1),
(2), (4) Date: Jan. 7, 2014

(87) PCT Pub. No.: WO2013/014649
PCT Pub. Date: Jan. 31, 2013

(65) Prior Publication Data
US 2014/0129136 A1 May 8, 2014

(30) Foreign Application Priority Data
Jul. 28, 2011 (IT) .............................. TO2011A0686

(51) Int. Cl.
G01C 21/00 (2006.01)
G01C 21/16 (2006.01)
G01S 19/25 (2010.01)
G01S 19/49 (2010.01)

(52) U.S. Cl.
CPC ................ *G01C 21/00* (2013.01); *G01C 21/16* (2013.01); *G01S 19/252* (2013.01); *G01S 19/49* (2013.01)

(58) Field of Classification Search
CPC ........ G01C 21/00; G01C 21/16; G01S 19/49; G01S 19/252
USPC .......................................... 701/445, 469, 472
See application file for complete search history.

(56) References Cited

U.S. PATENT DOCUMENTS

| 7,576,691 B2 * | 8/2009 | Trautenberg et al. .... 342/357.45 |
| 8,374,786 B2 * | 2/2013 | Buros ........................... 701/472 |
| 8,649,930 B2 * | 2/2014 | Reeve et al. ................... 701/24 |

(Continued)

FOREIGN PATENT DOCUMENTS

| CM | 101970989 A | 2/2011 |
| CN | 1890533 A | 1/2007 |
| CN | 101907467 A | 12/2010 |
| EP | 0 736 441 A1 | 10/1996 |
| GB | 2 298 539 A | 9/1996 |

OTHER PUBLICATIONS

International Search Report dated Oct. 12, 2012, issued in PCT Application No. PCT/IB2012/053863, filed Jul. 27, 2012.
International Prelimianry Report on Patentability and Written Opinion dated Jan. 28, 2014, issued in PCT Application No. PCT/IB2012/053863, filed Jul. 27, 2012.
Chinese Office Action dated Feb. 28, 2015, issued in Chinese Application No. 201280037668.2, Jul. 27, 2012.

*Primary Examiner* — Mary Cheung
*Assistant Examiner* — Atul Trivedi
(74) *Attorney, Agent, or Firm* — Workman Nydegger

(57) ABSTRACT

A method for ensuring continuity of service of a personal navigation device in the event of insufficient reception of GNSS satellite signals, wherein the user provides the personal navigation device with first data relating to the current position of the device through data input, and wherein the personal navigation device, in order to calculate its own position, uses the first data entered by the user and second data coming from localization tools associated with the portable navigation device and not using GNSS satellite signals.

20 Claims, 15 Drawing Sheets

(56) References Cited

U.S. PATENT DOCUMENTS

| | | | |
|---|---|---|---|
| 8,793,033 B2* | 7/2014 | Schuerman | 701/1 |
| 8,825,398 B2 | 9/2014 | Alexandre et al. | |
| 2006/0089786 A1* | 4/2006 | Soehren | 701/200 |
| 2007/0143009 A1 | 6/2007 | Nomura et al. | |
| 2008/0117100 A1* | 5/2008 | Wang et al. | 342/357.02 |
| 2009/0312948 A1* | 12/2009 | Matthews | 701/214 |
| 2010/0250133 A1* | 9/2010 | Buros | 701/216 |
| 2011/0054729 A1* | 3/2011 | Whitehead et al. | 701/29 |

* cited by examiner

If d>>k and on surface
$a = d \cdot \sin_a$
$b = d \cdot \cos_a$

METHOD FOR ENSURING CONTINUITY OF SERVICE OF A PERSONAL NAVIGATION DEVICE AND DEVICE THEREOF

BACKGROUND OF THE INVENTION

1. Field of the Invention

The present invention relates to a method for ensuring continuity of service of a personal navigation device and to an associated device hereafter also referred to as PND ("Personal Navigation Device").

More in particular, the present invention relates to a method for ensuring continuity of service of a personal navigation device which is used in the event of insufficient reception of GNSS satellite signals and, in particular, when the device is turned on following a period of inactivity.

2. Present State of the Art

Personal navigation devices for commercial use are now widespread, which can be used while walking or driving a vehicle, and which can give the user information about the geographic position of the device itself.

Said personal navigation devices usually utilize information sent to the Earth from suitable satellites belonging to the so-called global navigation satellite systems (GNSS), which include, among others, the GPS system, the GLONASS system and the European GALILEO system, which is still under development.

Said devices suffer from the drawback that they cannot operate properly or at all if they cannot receive a sufficient number of signals from such satellites. This may occur, for example, in indoor areas and, in general, wherever the radio-electric signals emitted by the satellites cannot reach the personal navigation device because of obstacles on their path. In addition, when these devices are turned on again after having been turned off or deactivated, one must wait for the personal navigation device to execute a number of operations for acquiring satellite signals in order to calculate its own position. For a GNSS satellite system of the GPS type, such acquisition operations are called, in technical jargon, "GPS fix".

These operations for acquiring satellite signals require a certain period of time, defined as "Time to First Fix", which is more or less long depending on various factors, which include among others the deactivation time elapsed since the device was last turned off and the computation efficiency of the personal navigation device itself. At any rate, said period of time may vary from a few tens of seconds to a few minutes, resulting in the inconvenience that the user cannot quickly obtain from the personal navigation device any information useful for knowing his/her position and the route that must be followed to reach the desired destination.

What makes this wait even more annoying is the fact that often the user is actually perfectly aware of his/her current position, as is the case, for example, when starting for a journey. This is typically the moment when the user has just turned on the personal navigation device after a period of inactivity.

In other words, the user generally knows the starting point of the route to be planned, which may be, for example, his/her home or workplace, a certain address which was his/her previous destination, a point of interest (airport, hotel, parking lot), and the like. Also, often the starting point is located in an indoor environment (private house, public building, closed parking area, garage) or in densely populated areas (old town centres, town districts with many skyscrapers), where satellite reception is very bad or absent at all. For this reason, the user is forced to move around "blindly", i.e. with no route indication from the personal navigation device, searching for an open place where reception of satellite localization signals is ensured, and then he/she has to wait there until satellite signals have been acquired.

Likewise, it may happen that, during a journey, the connection to the GNSS system is lost due to the presence of obstacles obscuring the satellite signals (e.g. tunnels, skyscrapers) or that the localization information becomes excessively inaccurate or unreliable because of insufficient or incomplete reception of satellite signals, so that the personal navigation device detects a current position which is wrong or anyway affected by an excessive uncertainty margin for it to be considered reliable.

In the above-mentioned cases of missed or insufficient reception of satellite signals, the personal navigation devices known in the art react in different ways.

For example, some personal navigation devices assume, when they are turned on, that the current position is the one that was detected when the device was last turned off. This assumption is wholly arbitrary and often untrue, and therefore wholly unreliable, and it is impossible for the personal navigation device to ascertain the correctness of the assumed position without first receiving a confirmation thereof through calculation of the actual position by means of a satellite fix operation.

In the event that satellite reception stops during the journey, some personal navigation devices try to deduce the current position by making some more or less plausible assumptions about the motion state of the device prior to the interruption, and cross-check such data with information obtainable from other sources, such as, for example, the available maps.

For example, when driving into a road tunnel, the personal navigation device placed on board a vehicle can no longer detect signals from satellites, and therefore assumes that the user keeps driving along the same road at the same speed as before entering the tunnel, until it receives again a valid GNSS signal which allows it to obtain the position on the basis of more reliable data.

This technique can be applied with satisfactory results only in particular cases, such as the one described, wherein the cause of the interruption of the reception of satellite signals is known a priori and the path that the personal navigation device can follow during said interruption is univocally known as well: the only unknown variable is instantaneous speed, which can hypothetically be assumed to be constant and equal to the speed detected just before entering the tunnel.

However, this technique cannot be used with acceptable results in the totality of cases. For example, when the signal is lost in a town area due to nearby buildings that limit satellite visibility, this technique cannot be applied because of the presence of many close crossings, so that the vehicle with the personal navigation device could follow various alternative routes which would be impossible to foresee a priori.

When GNSS signal reception is lost, some personal navigation devices exploit the presence of inertial systems for motion detection (gyroscopic sensors, accelerometers, and the like), called INS ("Inertial Navigation Systems"), and/or other sensors or measuring instruments (e.g. magnetometers, altimeters, odometers), which allow obtaining the instantaneous position by starting from a position known at a previous time instant and by calculating the path covered in the meantime. The set of INS systems and said other measuring instruments constitute, as a whole, a class of localization tools which are not dependent on GNSS systems; within the scope of the present description, these tools can be defined as "localization tools" in that they allow the personal navigation device to obtain its own current position, whether directly or indirectly, through suitable algorithms for correlating, processing and cross-checking the data provided by such tools.

Accelerometers belonging to the group of inertial navigation systems can also detect the spatial orientation of the apparatus or object to which they are anchored; they can thus be used for that purpose when implementing a number of functionalities, as will be described more in detail below.

Inertial navigation systems are generally based on double-integration operations carried out by starting from acceleration values measured by suitable gyroscopes; therefore, small measurement errors can accumulate over time and prejudice the accuracy of the calculated position, which rapidly falls below acceptable levels if a more reliable position datum is not available, based on which compensatory corrections can be made. This error accumulation phenomenon is commonly known as "drift error".

It is necessary that a personal navigation device, comprising an inertial navigation system, frequently has a new absolute position obtained from the GNSS system in order to calibrate the position calculated through the inertial navigation system, otherwise the uncertainty of the position provided will quickly become intolerable as the space being travelled increases.

Therefore, also those personal navigation devices that comprise an inertial navigation system have the drawback that they can only work when an initial absolute position is known, which they cannot do without when the GNSS signal is unavailable. Because of their principle of operation, they can only calculate relative movements with respect to a known initial position. The presence of an inertial navigation system in a personal navigation device, therefore, is not at all beneficial whenever the personal navigation device does not know an initial absolute position acquired on the basis of GNSS signals, as is the case when the device is turned on after a long period of inactivity.

SUMMARY OF THE INVENTION

It is therefore an object of the present invention to provide a method for ensuring continuity of service of a personal navigation device which allows to completely eliminate the wait for the calculation of the position of the device when the latter is turned on following a long period of inactivity.

It is another object of the present invention to provide a method for ensuring continuity of service of a personal navigation device, which does not require to be brought into an open place when it is turned on after a long period of inactivity in order to be able to calculate its own position based on radioelectric signals coming from satellites of a GNSS system. It is a further object of the present invention to provide a method for ensuring continuity of service of a personal navigation device, which has a reduced drift error and which does not require to receive data about its own position from GNSS signals.

It is yet another object of the present invention to provide a method for ensuring continuity of service of a personal navigation device, which allows correcting "on the fly" a position which is found to be wrong by the user on the basis of his/her own observations.

These and other objects of the invention are achieved through a method for ensuring continuity of service of a personal navigation device and a device thereof as claimed in the appended claims, which are intended to be an integral part of the present description. In short, the present invention relates to a method for ensuring continuity of service of a personal navigation device, which method is used when reception of GNSS satellite signals is insufficient and the personal navigation device cannot accurately determine its own position.

Insufficient reception of GNSS satellite signals mainly occurs in two cases: when the device is turned on after a period of inactivity, or when the satellite signal is lost due to obstacles between the satellite and the device itself.

The method according to the invention requires the user to enter his/her own position into the device, so as to provide the device with an initial datum which is then used by the device along with other data coming from localization tools associated therewith in order to determine its own position while waiting for a sufficient number of satellite signals allowing the device to operate normally.

Such localization tools comprise, for example, an altimeter, a magnetic compass, an inertial navigation system, an odometer, a speedometer, and the like.

The user does not need to know his/her own position in terms of precise geographic coordinates, i.e. latitude and longitude. It is in fact sufficient that he/she provides the device with a general indication, such as, for example, the position of a point of interest, or the last position stored in the device before it was turned off, or one may use images received from a remote archive.

Further features of the invention are set out in the appended claims, which are intended to be an integral part of the present description.

BRIEF DESCRIPTION OF THE DRAWINGS

The above objects will become more apparent from the following detailed description of a method for ensuring continuity of service of a personal navigation device and a device thereof, with particular reference to the annexed drawings, wherein.

DETAILED DESCRIPTION OF THE PREFERRED EMBODIMENTS

Figure 1:
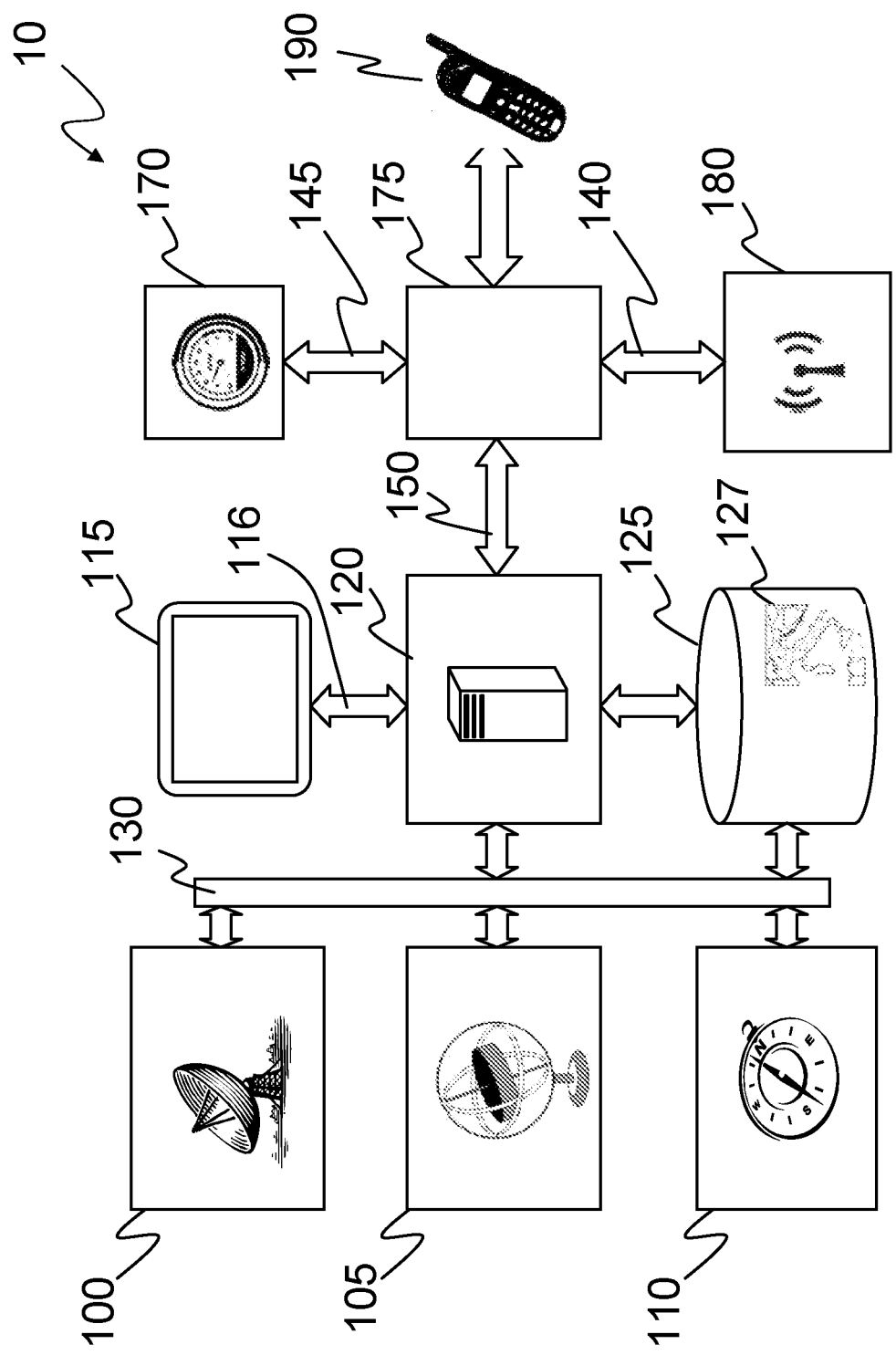
FIG. 1 shows a block diagram of a personal navigation device of the hybrid type.

Referring now to FIG. 1, there is shown a block diagram of a personal navigation device 10 of the hybrid type, i.e. comprising both a GNSS satellite signal reception module 100 and an inertial navigation module 105, i.e. an INS system.

Both modules 100, 105 are connected, e.g. through a first connection bus 130, to a microprocessor 120, to which they send data useful for calculating the current position of the personal navigation device 10.

The microprocessor 120 is the control and computation unit of the personal navigation device 10, under the control of which other units shown in FIG. 1 and directly or indirectly connected thereto can operate.

Said other units comprise a memory 125 containing all the data useful for the operation of the personal navigation device 10, such as maps 127, user data, configuration and personal settings, previously selected destinations, points of interest and the like.

The memory 125 may also contain, whether partially or totally, the firmware necessary for the operation of the personal navigation device 10, and may consist of one or more parts, which may be of the volatile or non-volatile type, of the ROM or RAM type, separable from the personal navigation device 10 or fixedly integrated therein.

A display or screen 115 allows displaying the maps 127, the current position calculated for the personal navigation device 10, the points of interest located in the surrounding area, as well as any other information that can be represented in graphic form.

An additional unit 110 may comprise other sensors or instruments in addition to those included in the satellite signal reception module 100 and in the inertial navigation module 105, which are integrated into the personal navigation device 10 to help establish the position with more accuracy and reliability.

The additional unit 110 typically comprises an altimeter, i.e. an instrument capable of detecting the elevation of a place from sea level, and/or a magnetic compass capable of detecting the direction of the terrestrial magnetic poles and, through suitable adjustments, also of the geographic ones.

The additional unit 110 is typically coupled to the microprocessor 120 through a connection bus that may be shared with the first connection bus 130 used by the satellite signal reception module 100 and by the inertial navigation module 105, as in the case shown in FIG. 1.

The term "connection bus" generally refers to any means of connection between terminal electronic apparatuses which can ensure the exchange of data as well as of control and flag signals.

Optionally, other sensors or auxiliary instruments 170 may be present and indirectly associated with the microprocessor 120 through a physical interface device 175.

This may occur when the auxiliary sensors 170 are connected through wireless connections that use radio frequency signals or wired connectors external to the personal navigation device 10, with which they can be associated by means of coupling plugs or sockets of any kind.

For example, the auxiliary sensors 170 may comprise an odometer and/or a speedometer of a bicycle, associated through a wireless connection 145 with the interface device 175, which consists of a radio frequency receiver and converts the signals received from the auxiliary sensors 170 to make them comprehensible to the microprocessor 120 by means of a second connection bus 150.

For example, the auxiliary sensors 170 may comprise an odometer and/or a speedometer of a vehicle, controlled by a suitable data processing unit or electronic control unit of the vehicle capable of sending the data measured by said auxiliary sensors 170 to the microprocessor 120 through the second connection bus 150, which operates via a wired or wireless connection.

In this particular case, the interface device 175 consists of said electronic control unit. Furthermore, the personal navigation device 10 may be associated, through the interface device 175, with a radio mobile telecommunications network terminal 190 and/or with a WLAN or Wi-Fi radio communications terminal 180 to gain access to remote computer systems, which can supply auxiliary data that can be used for locating the personal navigation device 10.

In particular, in the case of a personal navigation device 10 associated with a vehicle, it is possible to integrate the microprocessor 120, the memory 125, and at least a part of the satellite signal reception module 100, of the inertial navigation module 105 and of the additional unit 110 into the vehicle, whereas the auxiliary sensors 170, the radio mobile telecommunications network terminal 190 and the WLAN or Wi-Fi radio communications terminal 180 consist of separate devices, which may also come from a source or manufacturer other than those of the personal navigation device 10.

For the user to be able to enter data and commands, an appropriate input unit must be available. In general, the input unit may be provided in any form and manner, e.g. through a keyboard, a pointing device and push-buttons associated with a display, a voice command system, and the like. Preferably, the implementation of the present invention is described herein by using an embodiment of the input unit which comprises a touch-screen display, i.e. a unit that can acquire commands and other input data when a foreign body touches the display, based on the graphic information represented thereon and on the touch position.

In this embodiment of the invention, the display 115 also acts as a data and command input unit. It may be coupled to the microprocessor 120 by any means, e.g. through a two-way communication bus 116 capable of exchanging signals and data between the display 115 and the microprocessor 120.

The display 115 may be a separate or separable unit, or it may be integrated into the same casing that contains the microprocessor 120 and/or the other structural elements shown in FIG. 1, depending on the complexity, dimensions and intended use of the personal navigation device 10 (e.g. installed on a bicycle or a motorcycle, hand-held, partially or totally incorporated into a vehicle).

The display 115 and/or separate or separable data input unit may be connected to the personal navigation device 10 via a wireless connection (e.g. Bluetooth, Wi-Fi) or a wired connection, for the purpose of facilitating the manual entry of the current position in accordance with the present invention as well as the operation of some sensors (e.g. the integrated magnetic compass).

The data supplied by the auxiliary sensors/instruments 170 can be used by the microprocessor 120 to improve the localization data calculated by the inertial navigation module 105 and/or by the satellite signal reception module 100 by correcting drift errors or gaps in satellite reception based on the precision and accuracy detected for the INS sensors of the module 105, the GNSS sensors of the module 100 and the instruments of the additional unit 110.

The personal navigation device 10 further comprises other structural elements, such as a power supply unit, a battery, a loudspeaker for audio reproduction, and the like.

Figure 2:
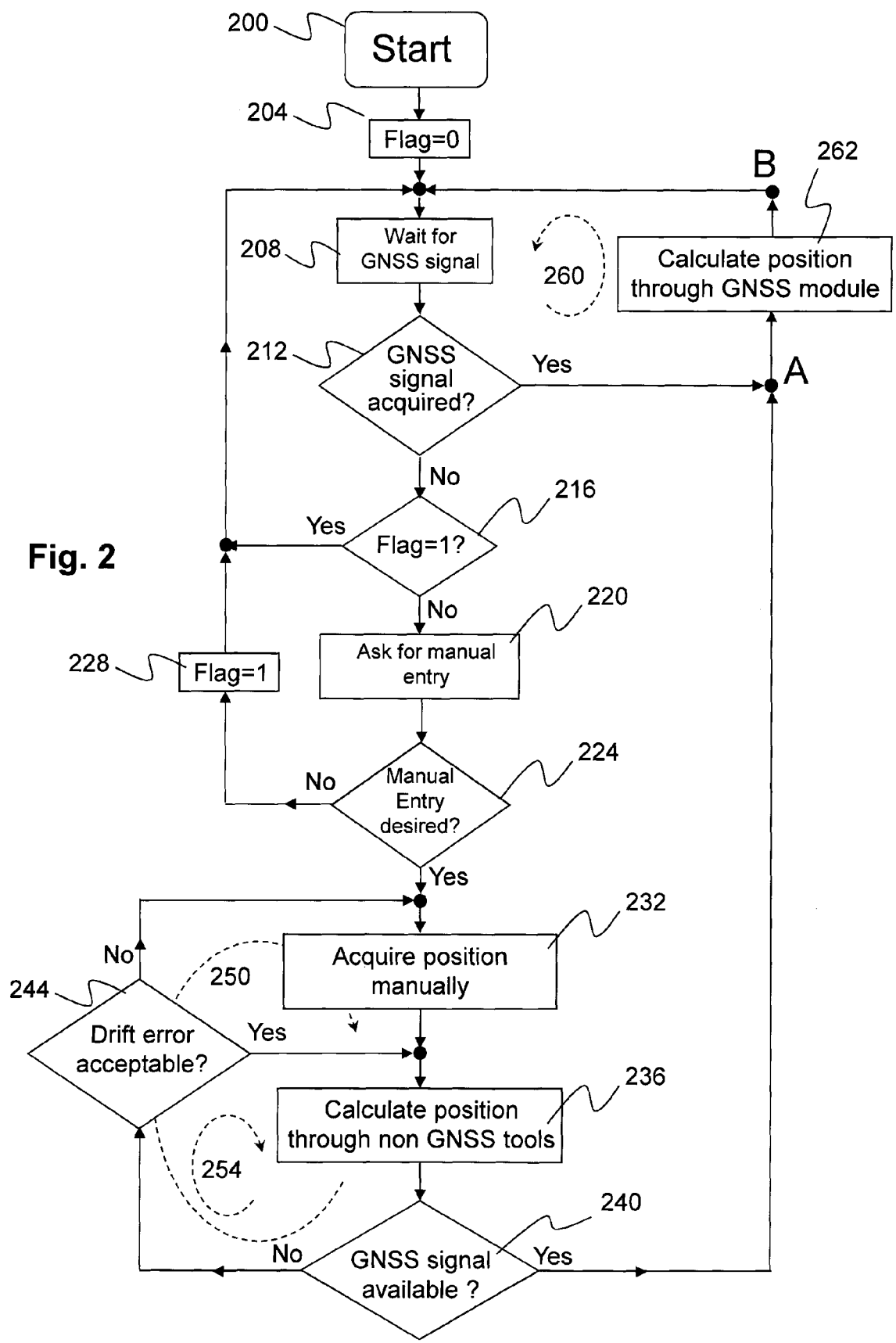
FIG. 2 shows a first mode of operation of the personal navigation device of FIG. 1, which implements a method for determining its own position in accordance with the invention.

FIG. 2 shows a first mode of operation of a personal navigation device 10 according to the invention.

When it is turned on, or after a reset operation, the personal navigation device 10 starts (step 200) and a variable FLAG is set to zero (step 204).

Then the microprocessor 120 activates the satellite signal reception module 100, which tries to receive and acquire GNSS satellite signals in order to calculate the current position of the personal navigation device 10 (step 208), while preferably indicating the signal acquisition status on the display 115.

If this attempt succeeds within a predetermined time interval (step 212), the current position is calculated (step 262) and is possibly shown on a map displayed on the display 115 in the way defined by the manufacturer of the personal navigation device 10 and in accordance with the currently active user settings.

As long as there are such a number of GNSS satellite signals to allow a sufficiently accurate localization, a cycle 260 is repeated with a certain frequency to update the position and calculate the speed, the direction of motion and possibly other quantities related to the variation of the instantaneous position and considered to be interesting for the user in accordance with the indications programmed in the personal navigation device 10.

If localization cannot be obtained from GNSS satellite signals within a predetermined wait time interval, or if the user enters a suitable stop command by means of the input unit, e.g. the touch-screen display 115, it is verified if the value of the FLAG variable is 1 (step 216).

The FLAG variable takes the value one if the user does not want to enter the position manually in accordance with the present invention, i.e. he/she has deactivated this function. In the affirmative case, in said first embodiment of the invention the microprocessor 120 induces the satellite signal reception module 100 to try to acquire a set of satellite signals adapted to allow locating the personal navigation device 10 (cycle 260) until said position can be calculated.

Figure 5:
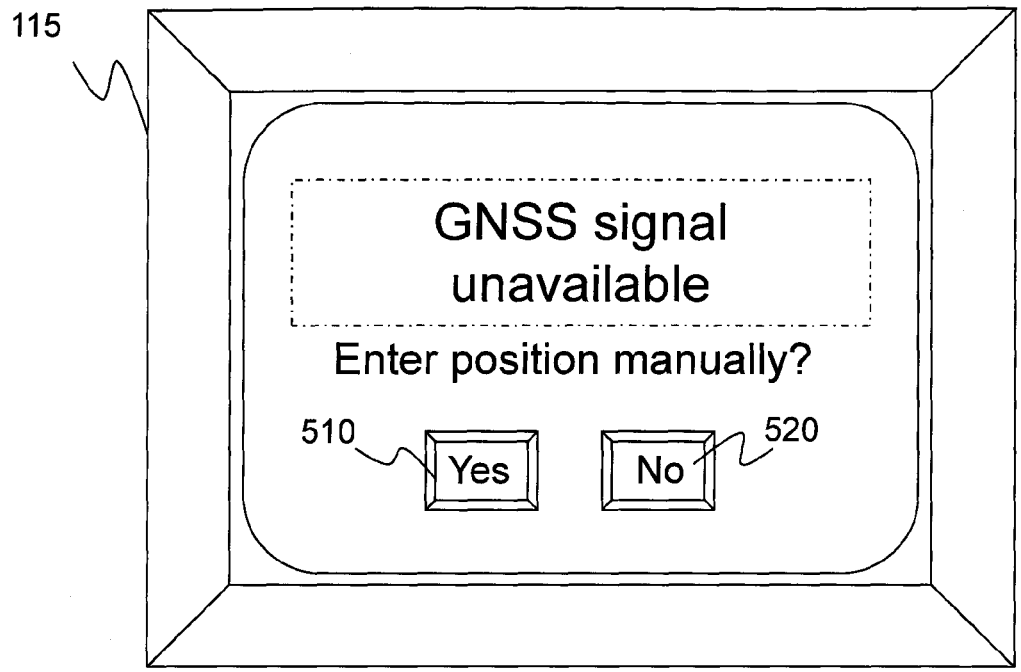
FIGS. 5 to 15 show screenshots that may be displayed on a screen of the personal navigation device of FIG. 1.

In the negative case, the user is warned that a valid GNSS signal is not available and is asked if he/she wants to use the possibility of entering the current position by executing a manual procedure (steps 220 and 224), e.g. via a screen such as the one shown in FIG. 5. If the user responds negatively, e.g. by touching a first virtual key 520 "No" shown on the display and input unit 115, the FLAG variable is set to 1 (step 228) in order to store the user's choice at this stage, and the personal navigation device 10 returns to the waiting state, awaiting a valid satellite signal (step 208).

If, on the contrary, the user responds affirmatively, e.g. by touching a second virtual key 510 "Yes" shown on the display as well as input unit 115, the user can execute the procedure for manually entering the position by means of data and commands made available by the personal navigation device 10 itself (step 232), as will be discussed more in detail below. Through this procedure, the user can supply to the personal navigation device 10 a set of first data adapted to define its current position.

Once the current position has been acquired, the personal navigation device 10 calculates the positions taken at a certain number of successive instants by using the inertial navigation module 105 and possibly also the additional unit 110 and any auxiliary instruments 170 available and not dependent on satellite signals (step 236).

Then the personal navigation device 10 verifies if in the meantime a valid GNSS signal has become available again (step 240) and, if not, it checks if the drift error stays under a predetermined maximum threshold (step 244). In the affirmative case, the sequence of steps 236 and 240 is reiterated. If the maximum allowable drift error threshold is exceeded, the system will return to the step 232 of manually acquiring the current position and will repeat the sequence of steps 236-240-244 already described.

In substance, a cycle 254 is repeated as long as the drift error stays below the maximum threshold and the GNSS signal is unavailable, whereas a longer cycle 250 is executed when said error exceeds the maximum allowable values, prompting the user to enter the position manually.

If the GNSS satellite signal becomes available again, then the microprocessor 120 activates the position calculation by using the GNSS satellite signal reception module 100 (step 262) and the cycle 260 is reiterated, wherein the personal navigation device 10 keeps locating itself by using the satellite signal reception module 100.

In brief, in the mode of operation of FIG. 2 the personal navigation device 10 waits to receive a GNSS satellite signal. If the latter is unavailable, and if the user so desires, the current position is entered manually and the subsequent positions are calculated by using the additional tools 105,110,170, 180,190 not dependent on satellite signals, until the latter become available again. These tools provide a set of second data useful for calculating the instantaneous position of the personal navigation device when the GNSS reception module 100 is not operating in an adequate manner. If the drift error exceeds a predefined maximum threshold, the manual entry procedure must be repeated in order to bring again the drift error under said threshold.

This first embodiment of the invention does not offer the user the possibility of immediately switch to the mode of operation not based on the satellite signal reception module 100 when the position given by the latter is inaccurate or if, for example, the user knows that he/she is about to enter an area not covered by GNSS satellite signals (e.g. tunnels, indoor places, woods, parking areas, and the like), when it is preferable to immediately switch to the mode of operation not based on satellite signals.

Figure 3:
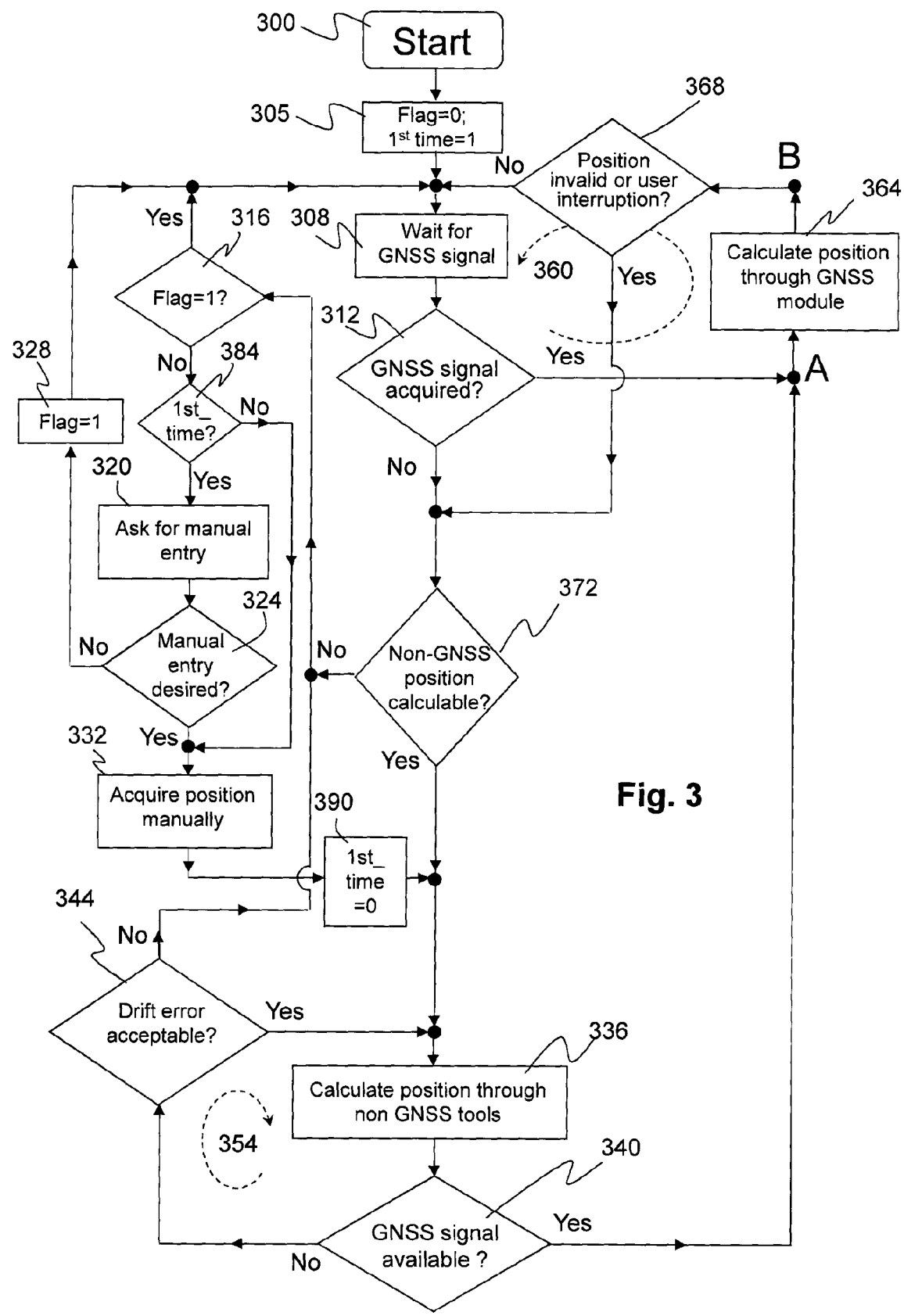
FIG. 3 shows a second mode of operation of the personal navigation device of FIG. 1.

Therefore, the method of the present invention can also be implemented into a second embodiment shown in FIG. 3.

The second embodiment of FIG. 3 differs from the embodiment of FIG. 2 for a step 368 included in the cycle 260 of FIG. 2, re-numbered in this case as 360, concerning the mode of localization through the satellite signal reception module 100.

In this case, the personal navigation device 10 periodically checks if the position calculated through the satellite signal reception module 100 has a degree of accuracy higher than a second predefined threshold or the user has expressed the desire to stop this mode of localization because, for example, he/she has realized that the current position shown by the personal navigation device 10 is wrong or unreliable.

When at least one of these conditions occurs, the personal navigation device 10 exits the cycle 360 and behaves differently depending on whether the current position can be calculated with the help of the non-GNSS tools (inertial navigation module 105, additional tools 110,170,180,190 and maps 127) or not (step 372).

It may in fact happen that the combination of the data coming from all non-GNSS-dependent localization tools, i.e. the inertial navigation module 105, the maps 127, the additional unit 110 and the external devices 170,180,190 associated with the personal navigation device 10 (odometer and speedometer of the vehicle, information from the radio mobile network or from other radio communications systems), have such a level of accuracy that the personal navigation device 10 can be located autonomously, without having to interactively acquire its position through the user's manual intervention. It is in fact possible to keep all the non-GNSS-dependent localization tools active to calculate the position of the personal navigation device 10 also while the satellite signal reception module 100 can provide its own position to the user.

This arrangement, although on the one hand this increases the complexity and computation power needed for localization, on the other hand it minimizes the number of user's manual interventions required in order to ensure continuity of service of the personal navigation device 10.

Moreover, the additional unit 110 and the external devices 170,180,190 can be used by both the satellite signal reception module 100 and the inertial navigation module 105 in order to improve the accuracy of the calculated position, by cross-checking the localization data supplied by the modules 100, 105 with those obtainable from the map 127 (presence of roads or other drivable or pedestrian places, elevation, radio mobile or Wi-Fi cell in which the device is located) and by correlating these data with the knowledge of the holder of the personal navigation device 10 (e.g. pedestrian, motorcycle or bicycle, terrestrial vehicle).

If the verification carried out at step 372 about the possibility of calculating the current position by means of non-GNSS tools is successful, then the position is calculated by using such tools until the presence of a GNSS satellite signal is detected again (step 340) and the drift error is found to be tolerable (step 344), thus entering a cycle 354 of calculation by means of non-GNSS-dependent tools already described with reference to FIG. 2 as cycle 254.

If, on the contrary, the current position cannot be calculated autonomously by using non-GNSS-dependent tools, or if the user exits the cycle 354 of calculation by means of non-GNSS-dependent tools, the process continues to step 316, wherein it is checked if the user has expressed the desire to execute the interactive manual position entry procedure by using the same mechanism for initially setting and verifying the value of the FLAG variable, already described with reference to FIG. 2. Subsequently it is verified (step 384) the value of a 1ST_TIME variable, which was initially set to 1 at step 305.

The 1ST_TIME variable is used to avoid that the user is asked several times if he/she wants to activate the interactive manual position input procedure. If the process has arrived at step 384 for the first time, the personal navigation device 10 asks the user if he/she wants to activate the manual position entry procedure (step 320); in the case of negative answer (step 324), then the personal navigation device 10 sets the FLAG variable to 1 and re-enters in the cycle 360 awaiting the GNSS satellite signal. In the case of affirmative answer (step 324), then the personal navigation device 10 acquires the current position manually from the user (step 332) and sets the 1ST_TIME variable to zero (step 390) to signal that the request has been made; it afterwards enters the cycle 354 of localization by means of tools not dependent on satellite signals.

The personal navigation device 10 operating in either one of the two modes of operation described in FIGS. 2 and 3 therefore needs to acquire the current position through manual intervention of the user in the particular circumstance wherein GNSS signals from satellites are absent or insufficient, so as to allow locating the personal navigation device 10, or in the case wherein the user stops the mode of operation because he/she realizes that his/her own position is wrong due to particular configurations of the road network (e.g. close parallel roads, errors of correlation between the map data and the estimated position, insufficient GNSS signals, and so on).

In substance, in order to obtain its current position the personal navigation device 10 exploits a set of first data entered by the user and a set of second data coming from non-GNSS tools (105,110,127,170,180,190) when the GNSS signal is unavailable or inadequate.

It is advantageous and desirable that such interventions are minimized and carried out only when strictly necessary. To achieve this goal, it is appropriate that the non-GNSS-dependent instruments and sensors operate at the highest possible accuracy: this also allows minimizing the drift error introduced in particular by the inertial navigation module 105, which operates through double-integration operations.

For example, an altimeter is nothing other than a barometer that estimates the elevation from sea level by measuring the atmospheric pressure. Due to weather changes, this measurement may quickly become inaccurate, and the altimeter must be recalibrated on the basis of a known current elevation.

Also the compass, which uses the direction of the magnetic field, is affected by a similar need, though less stringent as far as time is concerned. The terrestrial magnetic poles, in fact, do not coincide with the geographic ones, and for this reason there are maps, for every place of the terrestrial surface, for correcting the angular offset between the actual direction of the geographic north pole and the magnetic one, called magnetic declination. Unlike geographic poles, magnetic poles move (though slowly), and therefore maps become obsolete within a few months.

Even an odometer or a speedometer may undergo operating drifts over time, and it may be necessary to recalibrate these auxiliary instruments 170, if the personal navigation device 10 can do it and if said instruments 170 offer this possibility; as an alternative, the personal navigation device 10 may apply a corrective factor or addend to the localization data supplied by these auxiliary instruments 170, which takes into account this drift and allows to obtain more accurate data, which are of crucial importance to obtain a precise localization.

Figure 4:
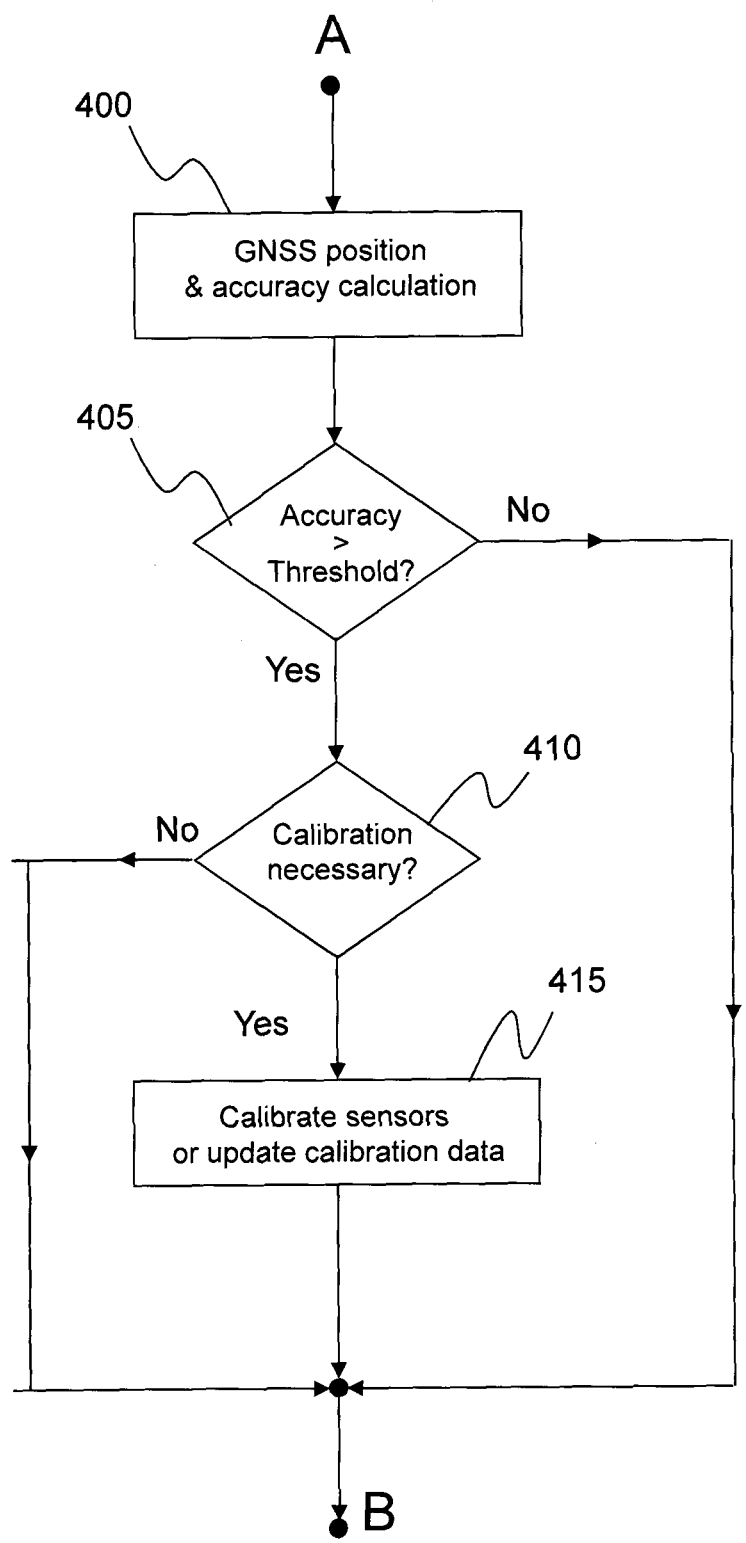
FIG. 4 shows a flow chart of a calibration procedure.

FIG. 4 illustrates a measure which can be taken in order to achieve this result. It is known that the GNSS signal can be more or less accurate depending on several factors, such as, for example, the number of satellite signals picked up; the accuracy can be obtained from the satellite signal reception module 100. Therefore, after the position and the accuracy thereof have been calculated with GNSS tools (step 400), it is verified if such accuracy exceeds a certain predetermined threshold (step 405). If not, the calibration is not carried out and the procedure ends. In the affirmative case, at step 410 it is verified if it is necessary to calibrate a specific instrument, by acquiring the value of the physical quantity measured by the same and by comparing it with the very accurate one obtained from the satellite signal reception module 100. If, for example, a certain time interval has elapsed since the last calibration and operating drifts have been ascertained with respect to standard acceptable values and the calibration data to be applied to the instrument are no longer valid, then they are updated. This step is carried out by reading the auxiliary localization data (direction of the magnetic north pole, instantaneous speed, travelled space, altimetry) supplied by the auxiliary instrument and by comparing them with those obtainable from the data supplied with high accuracy by the satellite signal reception module 100. In the negative case, no calibration is executed and the procedure ends; in the affirmative case, at step 415 all instruments that allow it are calibrated or, alternatively, the corrective factor or addend to be used for the data supplied by the auxiliary instruments is calculated.

For example, in the case of a magnetic compass, the personal navigation device 10 may keep in memory a map of the magnetic declination present in the geographic region of use, with a predetermined spatial resolution (e.g. a few tens or hundreds of kilometers). If by reading the magnetic compass the personal navigation device 10 detects that in a certain area the magnetic declination indicated by the corresponding map stored in the memory is different from that measured through the satellite signal reception module 100 by a predetermined tolerance level, then the personal navigation device 10 can update the data with those measured through the module 100.

This can be done, for example, by storing the magnetic declination data into a rewritable memory or by letting each area of the magnetic declination map be associated with a corrective addend that can be updated over time by the personal navigation device 10 in order to take into account the movement of the terrestrial magnetic poles.

In a further example of embodiment of the calibration mechanism of FIG. 4, it is assumed that the personal navigation device 10 is placed in a vehicle and is associated with the vehicle's speedometer, which is used for calculating the current position in the absence of GNSS signals.

It is known that vehicular speedometers have limited precision and tend to detect an instantaneous speed which is higher than the actual one. When the personal navigation device 10 succeeds in calculating its own position through the GNSS localization module 100 with great accuracy, higher than a predetermined threshold, it can also calculate with the same high accuracy its own instantaneous speed on the basis of measurements of movement, i.e. variations of current positions obtained at successive times at a known time distance.

Therefore, in this particularly favorable operating condition, the personal navigation device 10 can acquire the speed given by the auxiliary localization instrument (speedometer) and compare the acquired value with the one obtained by starting from the current position given by the GNSS localization module 100. If this comparison is being made for the first time, the device can calculate the error (whether absolute or relative) of the speed reading supplied by the speedometer and store it for a certain speed value or speed interval into a calibration memory comprising speedometer correction values.

When the personal navigation device 10 must necessarily use the speedometer in order to calculate its own position, in the absence or insufficient signal reception of type GNSS, it uses the speedometer calibration values to correct the values acquired in this operating mode, thus being able to calculate its own current position more accurately than if such corrective values were absent.

Instead, if the personal navigation device 10 had already stored speedometer calibration values, after comparing the speed indicated by the speedometer with that indirectly obtained from the GNSS localization module 100 it verifies if the calibration value previously calculated and stored is still valid or must be updated due, for example, to ageing of the speedometer or to changed operating conditions thereof (temperature, pressure, humidity, manipulations, transmission errors, and the like).

The operating diagrams of FIGS. 2 and 3 are merely exemplificative. Actually, the two modules 100,105 may, always and in any case, calculate the current position simultaneously whenever possible, and then choose the one which at a given moment is considered to be more reliable by taking into account all the variables involved. In other words, FIGS. 2 and 3 may include a step of calculating the current position through the inertial navigation module 105, followed by a step of comparing it with the same position calculated through the satellite signal reception module 100 and by a step of selecting the best one. The possibility of manually entering the current position will in this case be activated only if the localization thus obtained does not provide a satisfactory result or if the user decides to stop the parallel localization procedure and enter it manually.

Figure 6:
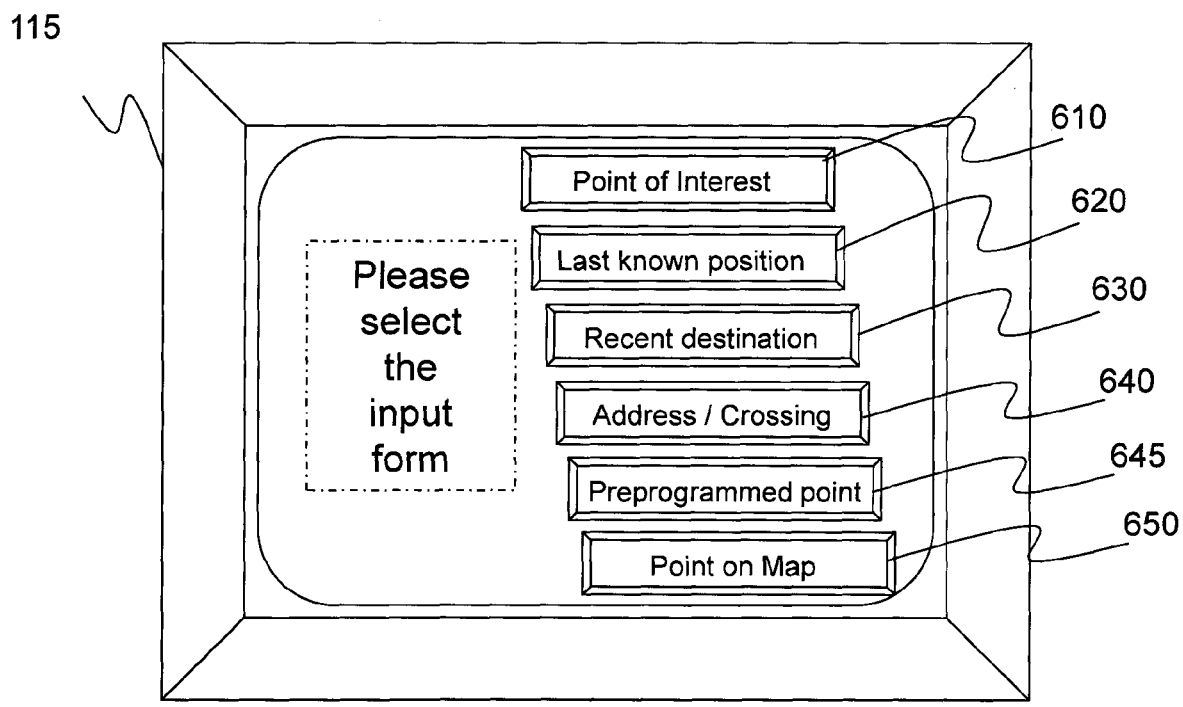

One possible way of activating the interactive manual current position entry procedure (step 232 of FIG. 2 or step 332 of FIG. 3) is shown in FIG. 6.

The user is asked how he/she wants to enter the current position, by choosing among the possible options. Generally the user does not know his/her position in terms of geographic coordinates (latitude and longitude) or of data mathematically related thereto, and therefore this manual current position entry option is preferably not offered because it would be wholly useless or even counterproductive, since it would cause confusion and bewilderment in the user.

Typically, the place where the user is when he/she turns on the device 10 is known and may be a PoI (Point of Interest), i.e. a place where there is something of particular interest for the user, such as a service station, an airport, a monument or other tourist attraction, a parking lot, a camping ground, a restaurant, a hotel, and the like.

The position, the name and other characteristic elements (telephone number, description and the like) of these PoI's are stored on the map 127 contained in the memory 125 of the personal navigation device 10 and can be searched for, recalled and sometimes also added and/or modified by the user.

The user is thus offered the possibility of selecting a PoI as the current position (option 610). In the event that the user selects this entry mode, the personal navigation device 10 preferably offers him/her the possibility of selecting the current position PoI in an intelligent manner, e.g. by presenting the last selected PoI's, starting from the most recent one down to the least recent one, while anyway giving the possibility of selecting any PoI according to type, location and other criteria considered to be more appropriate.

The place where the user turns on the personal navigation device 10 is often, however, the last position known and calculated through the satellite signal reception module 100 and/or the inertial navigation module 105 with the possible help of additional 110 or auxiliary 170, 180, 190 sensors or instruments, i.e. by means of the whole set of non-GNSS localization tools.

This position can therefore be presented as a second option for the current position entry mode (option 620). Usually the personal navigation device 10 stores the last known position in a non-volatile manner, so that it is kept in memory even when the personal navigation device 10 is turned off and then on again. Since the personal navigation device 10 is normally turned off when reaching the destination of a journey and is then left in that place, this is often also the place where it is located when it is turned on again, and it may be time-consuming or even impossible to receive a valid satellite signal that allows locating the personal navigation device 10, because the necessity to do the satellite fix or because of a obscuring situation of GNSS satellites, respectively.

Another advantageous way of entering the current position consists of one of the recent destinations (step 630) stored by the personal navigation device 10. Typically, in fact, the personal navigation device 10 automatically saves destination places such as, for example, PoI's, street addresses and the like, which are selected in the course of the operating life of the personal navigation device 10. Since it is likely that a certain destination already entered may be the starting point for a new journey, the user is given the possibility of selecting it quickly by choosing it from a list of destinations already entered and automatically saved, preferably in alphabetical order or in reversed time order of entry, i.e. from newest to oldest.

Of course, it is possible that the user knows the current position of the place where the personal navigation device 10 is in terms of street address or crossing, because he/she can acquire such information directly from on-site indications (road signs indicating the name of the place and/or of the street, house numbers on buildings, and the like) and/or from information acquired otherwise from third parties (e.g. communicated by other persons). The user is thus given the possibility of entering the current position in this form (virtual key 640); therefore, he/she is asked to enter the data necessary for identifying the street address or crossing, such as country, town, name(s) of the street(s), square name, house number, and so on. Advantageously, the microprocessor 120 of the personal navigation device 10 will automatically store this street address or crossing into the memory 125 among the recent destinations and/or the PoI's, so that it can be recalled easily for future use.

Thanks to the method according to the present invention, the user can enter beforehand the known starting position for a journey when he/she is still comfortably at home or anyway within a closed building, where probably the satellite signal cannot be received, store said position as the desired starting position for the next activation, and then turn off the personal navigation device 10.

In this manner, when the personal navigation device 10 is turned on again, typically in a parking area or in a place where some time is needed for acquiring the satellite signal, it will be able to use the starting position previously programmed by and known to the user to calculate the current position through the inertial navigation module 105 and the other non-GNSS-dependent auxiliary tools 170, until the GNSS signal becomes available again. In the list of the manual entry mode shown in FIG. 6 can also be added this position, which has been previously entered and stored, or pre-programmed by the user. This eliminates the annoying initial space of time when no navigation instructions are available due to absence of the GNSS satellite signal: the user is no longer forced to wait and/or go outdoors in order to enter an area with GNSS satellite coverage.

The same procedure is applicable to any other geographic point or place selectable on the personal navigation device 10, such as, for example, a place of arrival of a journey. It is therefore conceivable to provide a corresponding fifth current position entry mode, called pre-programmed point mode, corresponding to the virtual key 645 of FIG. 6. The advantage of this current position selection mode is that it can be immediately recalled by the user and does not require the user to execute a long interactive procedure for selecting the position from a list or a map, nor to enter any address or crossing.

At the end of the step of entering the current position in any one of the five current position entry modes described so far (PoI, last known position, recent destinations, address/crossing, pre-programmed point), the personal navigation device 10 can show to the user, on the display 115, the current position just entered on a map, preferably centered on said position with a predetermined zoom level and in a certain scale, which may depend, for example, on the density of objects near said position (streets, PoI's, crossings) and/or also on values that can be preset by the user while adjusting the modes of operation of the personal navigation device 10.

Figure 7:
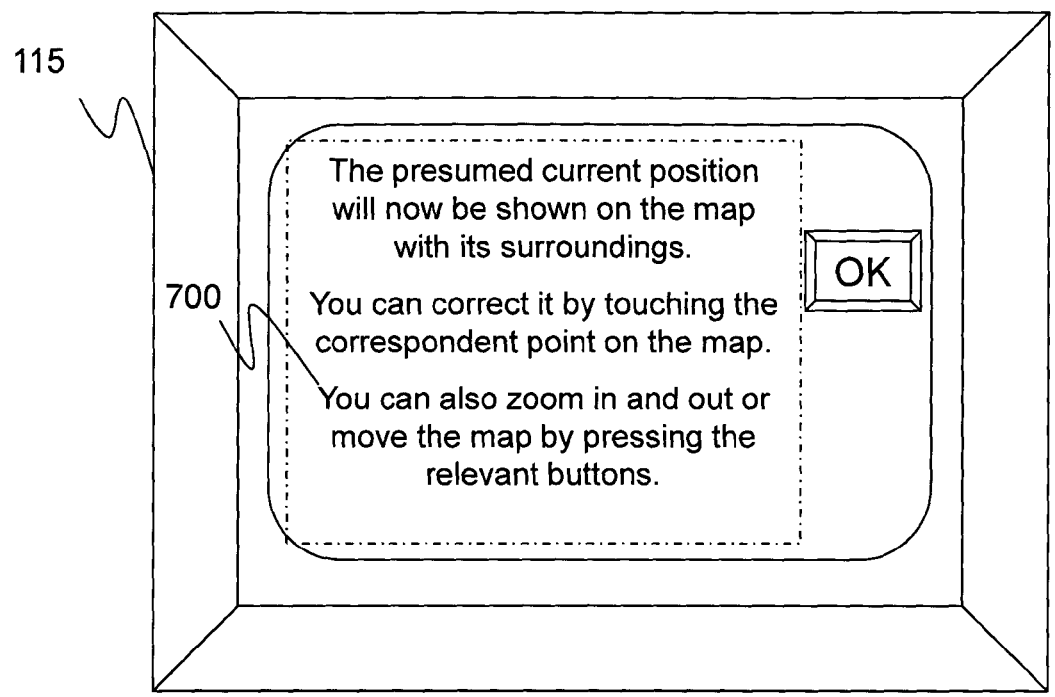
Figure 8:
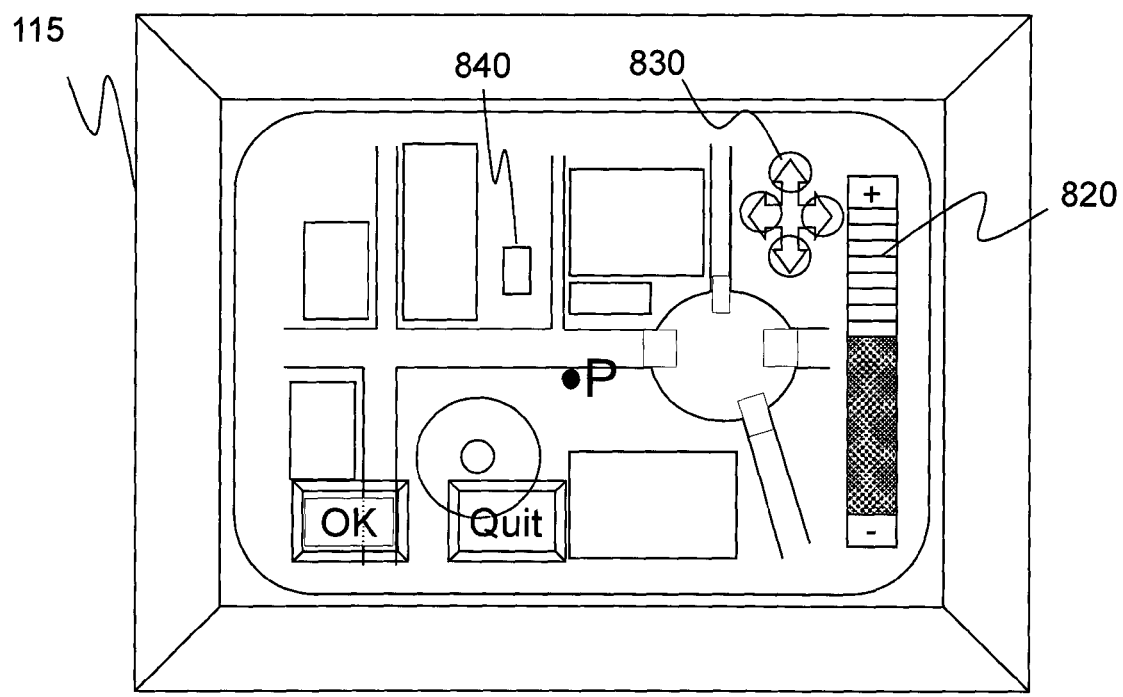

One example of such a map screen shown on the display 115 is illustrated in FIG. 8. This screen of the display 115 may possibly be preceded by a message explaining the adjustments and the commands available therein, as shown in FIG. 7. Alternatively, a virtual help key (not shown) may be added to the screen of FIG. 8, which, when pressed, displays a help screen 700 as shown in FIG. 7; this help screen may also be automatically displayed after a predetermined time has elapsed without any commands being selected on the display 115.

Whatever the choice made by the user as to the current position entry method, at some point the display 115 may show an area of the map centered on the current position entered manually by the user, both in order to receive a confirmation of the correctness of the entered position and to make any corrections or verifications of said correctness, so as to increase, if possible, the accuracy of the entered position. Once the user has confirmed the entered position, it can be used as the current position of the personal navigation device 10, which will use it to calculate the next positions based on the non-GNSS localization tools available (inertial navigation module 105, additional unit 110 and auxiliary tools 170, 180,190).

The screen of FIG. 8 offers the possibility of altering the zoom level of the map being displayed through a virtual adjustment bar 820, as well as the possibility of moving the map area being displayed by means of a cross keypad 830. Preferably, the map area initially displayed is centered on the selected position. The current position, entered by whatever means by the user, is indicated on the map, for example, through a point P located on the entered position; the user can either confirm the exactness thereof or redefine the position, e.g. by touching the map in the correct place and confirming the position by pressing a virtual key 831, as described in the help screen 700 of FIG. 7.

The user can be assisted to verify the correctness and accuracy of the entered position in various ways. If the personal navigation device 10 has in its memory information about objects or entities being currently framed in the map 127, or anyway located at distances shorter than a predetermined value from the entered current position to be confirmed, then it may display such information on the display 115. If, for example, images of a building 840 are present in the memory, such images are shown on the display 115, either automatically or upon the user's request. All the information available to the personal navigation device 10 may be displayed, whether sequentially or simultaneously, for the map area being displayed, such as street numbers, square and street names, PoI's with associated information, last known positions with time indications, last known destinations with time indications, photos, images and videos of objects or places, and so on.

In order to avoid showing too many auxiliary indications that may be difficult to see, these indications may be displayed in groups upon selective commands entered by the user. All the objects (buildings, monuments and other geographic places) being framed in the map display and for which the personal navigation device 10 has auxiliary information may be marked in any graphic manner, so that the user can then select those of interest to be shown on the display 115 by touching the screen on the desired object. In the event that there are images of said objects taken from different known positions, priority may be given to that image which was shot from the position closest to the current one, if possible showing also that position on the map, so as to give the user some reference points based on which he/she can establish the current position of the personal navigation device 10 with respect to that shooting position. Interactively explorable images may also be available, which were captured with special shooting apparatuses capable of capturing almost the entire three-dimensional visual field observable from a given geographic position.

For example, the system called Google Street View (hereafter also referred to simply as GSV) is already available on the Internet, which allows for interactive on-line exploration of geographic environments captured with special vehicles.

The personal navigation device 10 may have access to the GSV system and send thereto the data relating to the currently selected position, retrieve where available any explorable images in the map area surrounding that position, display them on the screen of the display 115, and allow the user to "explore" the area around the presumed current position, thus allowing him/her to verify the correctness and accuracy thereof and to correct it, if necessary, with relative ease. In fact, the user can compare the images being shown on the screen of the display 115, supplied by the GSV system, with the actual ones around him/her, and move within the three-dimensional environment until he/she finds that geographic position having the same scenery as the one which is visible from the actual current position.

If, for example, the personal navigation device 10 is a portable one, the user can move to a geographic point where there is maximum resemblance to the explorable images and then enter manually into the personal navigation device 10 the current position corresponding to the shooting point from which the images of the GSV system were captured. The images made available by this system were typically taken a few months or years before, so that some landscape details (buildings, trees) may have changed in the meantime, but in most cases any differences are not such as to prevent the user from properly recognizing the actual places from the images provided by the GSV system. Preferably, the personal navigation device 10 is equipped with a magnetic compass and with suitable data for magnetic declination correction, so that it knows the direction of the cardinal points even in the absence of any valid satellite signals; moreover, the inertial navigation module 105 can instantaneously detect the orientation of the personal navigation device 10 when, for example, it is being held in hand by the user or it is on board a vehicle. When the user is moving within the virtual environment of the explorable images, the personal navigation device 10 may also indicate on the screen of the display 115, instant by instant, the direction from which the explorable image being displayed were shot, since it knows the shooting orientation of the explorable images, as instantaneously provided by the GSV system: this helps the user to orient him/herself and to find more easily a correspondence between the actual scenery and the scenery being displayed on the screen by the GSV system. This indication can be displayed on the map shown on the screen of the display 115 or with respect to the actual orientation taken by the device 10 when displaying the image provided by the GSV system.

The user can move interactively in these explorable images and change his/her visual field, either by "moving" in the environment through linear translation or by "looking" in different directions (high-low and right-left), or by enlarging or reducing the displayed area, all within predefined directions and limits. One may therefore use touch-screen graphic control interfaces similar to the virtual recording bar 820 and to the virtual cross keypad 830 shown in FIG. 8.

It is advantageous that the use can quickly switch from the GSV display to the corresponding map display (e.g. the one stored in the personal navigation device 10), showing the shooting position of the explorable images and the framing direction of the last displayed image, so that the user can immediately locate that map position which corresponds to the scenery made up of the explorable images just watched and the direction from which the displayed image was taken.

Figure 9:
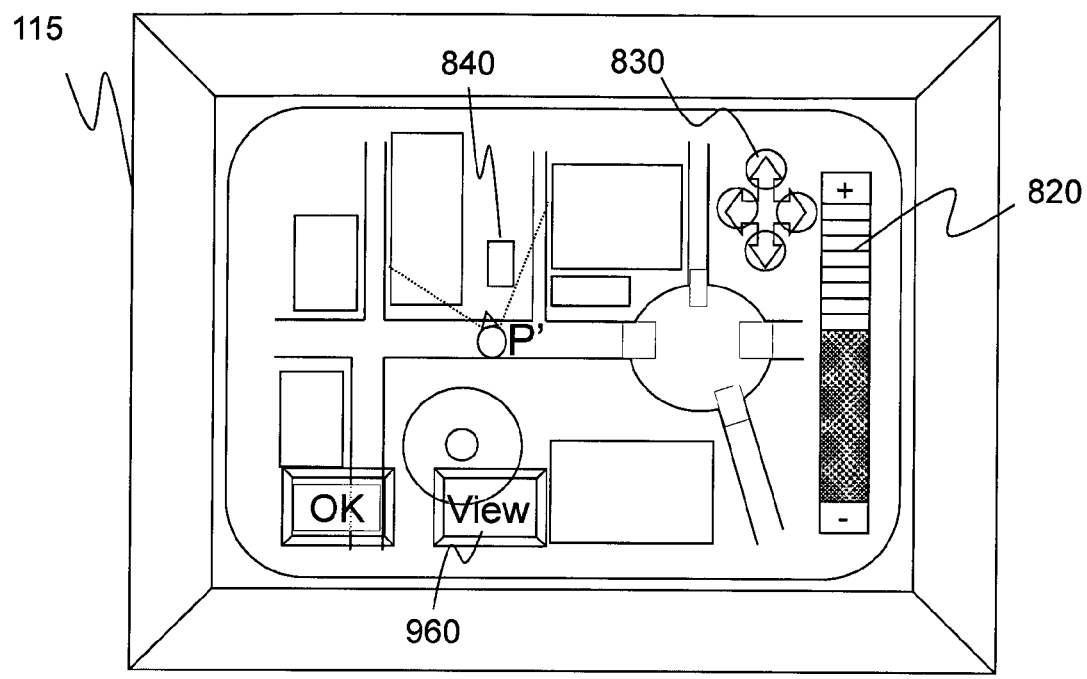
Figure 10:
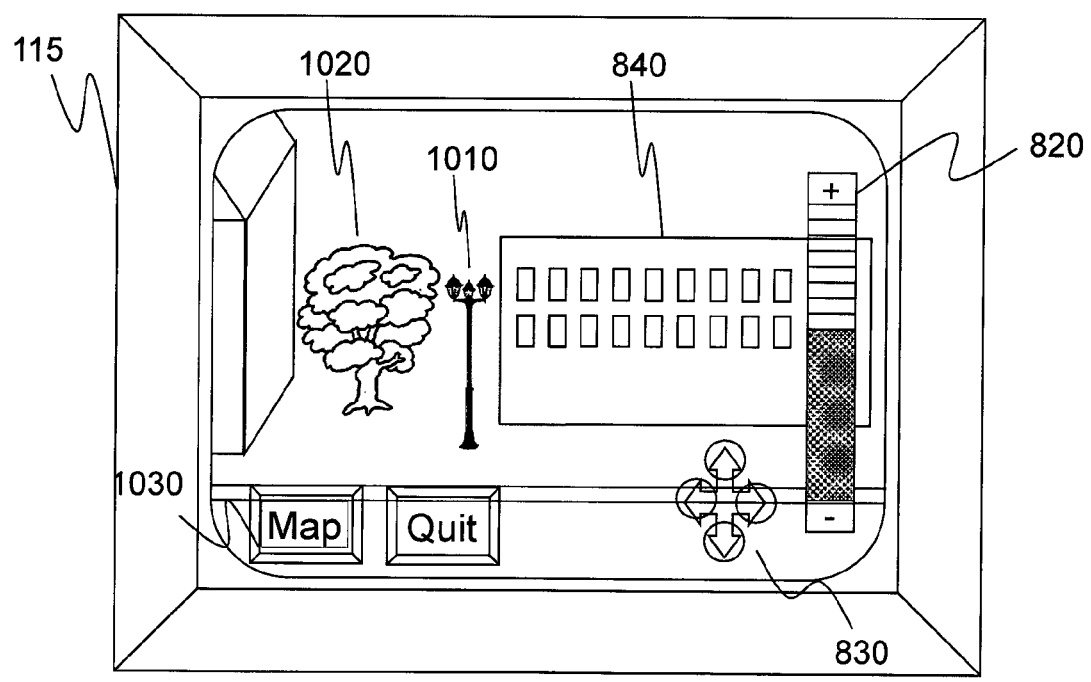

By way of example, reference can be made to FIGS. 8, 9 and 10. Suppose that at the end of the manually entering the current position, in any one of the modes described so far and also in the one that will be described below, the user specifies as the current position the one indicated by the point P in FIG. 8. At this point, since the personal navigation device 10 has access to the GSV system, it sends to said system the coordinates of said presumed current position, and the system replies by sending the explorable images captured from a second point P', which is the point closest to the point P for which explorable images are available.

It is advantageous to ensure that this only takes place if the second point P' is at a distance from P which is shorter than a preset value; otherwise, the user is warned that no GSV images exist which are close enough to the presumed location of the personal navigation device 10. The personal navigation device 10 receives the images of the second point P' and shows them on the screen of the display 115 together with the associated interface controls, through which the user can explore the GSV images in various directions and with different zoom levels, as schematically shown by way of example in FIG. 10.

At any moment the user can switch from displaying the GSV images to displaying the map shown in FIG. 9 or vice versa, respectively by means of the quick switching keys 1030 (FIG. 10) and 960 (FIG. 9). The shooting point P' is indicated on the map, as well as the shooting direction of the currently active GSV image, by means of the vertex of a triangle opposed to a circle 850 centered on the second point P' of FIG. 9. Two dashed lines 860,870 represent the angle of vision covered by the GSV image shown in FIG. 10. The user can perform translational movements of the position of the second point P' either by dragging it directly on the map display of FIG. 9 or by using specific virtual keys (not shown in FIG. 10) when displaying GSV images, of course only in directions for which images are available.

Suppose that the personal navigation device 10 and the user are actually in a position close to the point P and to the second point P', so that the user can see the building 840 and most of the surrounding buildings shown on the map of FIGS. 8 and 9 and visible in the GSV images of the area. It may be that a tree 1020 present in the GSV image has been felled in the meantime because it died after the image had been captured, or that the tree has grown and looks different when the user sees it. It may also be that the town administration has decided to replace a street lamp 1010 of FIG. 10 with a more advanced and functional one. However, these changes will certainly not prevent the user from recognizing the place where he/she is and to identify his/her current position with relative ease and good accuracy. Therefore, by comparing the real scenery that the user can see from his/her point of view when he/she is sufficiently close to the personal navigation device 10 with those previously captured by the GSV system and shown interactively on the display 115 of the same device 10, the user can easily find the position where he/she is located by moving within the GSV environment or, equivalently, on the map, until what he/she can actually see matches as much as possible what is being shown by the GSV system.

When the user thinks that he/she has found his/her position, he/she enters it into the personal navigation device 10, e.g. by pressing the virtual key 970 of FIG. 9 or by entering the presumably correct current position by touching the screen 115 on the map in the point corresponding to that position.

In order to minimize the band occupation required for transmitting the GSV images, it is conceivable that, when establishing the connection and requesting the images to the GSV system, the personal navigation device 10 sends data about the resolution of the display 115 or anyway equivalent information about the desired resolution of the images. Thus the GSV system can, if necessary, scale the images to obtain the requested resolution or anyway a resolution suited to the screen 115 of the personal navigation device 10, without having to transmit useless visual information that cannot be shown to the final user.

The images supplied by the GSV system may be stored locally into the memory 125, or they may be downloaded from the Internet through a WLAN (Wireless LAN) connection to the radio interface 180 of the personal navigation device 10, or through a data connection established (whether directly or indirectly, as will be explained more in detail below) by means of a data communication using a radio mobile terminal 190.

The five current position entry options can thus be complemented by a sixth option (virtual key 650 of FIG. 6), consisting of entering the position directly on the map in an interactive manner, still with the help of information and functions available in the personal navigation device 10. When the user selects this option on the screen of the display 115, the latter will display an area of the map stored in the memory 125 of the personal navigation device 10 according to various modes.

As a first step, the initial map area displayed may be an area predefined by the user or by the manufacturer, e.g. a continent, a country or a geographic region set by the user or by the manufacturer. If the personal navigation device 10 has access to a radio mobile telecommunications network interface, it may acquire from said network the coverage area of the radio mobile cell where the device 10 is and centre the map and adjust the zoom level on the basis of the position and coverage of the base station of the radio mobile network to which the personal navigation device 10 is connected. It should be noted that such information may be acquired either directly, through a radio connection interface incorporated by whatever means into the personal navigation device 10, which may be associated with a dedicated network access SIM card, not shown in FIG. 1, or indirectly, through the radio mobile signal 190 with which the personal navigation device 10 can communicate over any type of connection, whether wireless or wired, e.g. through the interface device 175 (Bluetooth, USB and the like).

Once the map has been shown in the initial configuration based on any chosen criterion, such as one of those described above, the user can be given the possibility of interactively entering the current position directly on the map, e.g. by touching with a finger or any other pointed object the corresponding point on the geographic map displayed on the screen 115. The user may have previously selected the area of the terrestrial surface to be displayed on the map and the associated zoom level in a similar way as already described with reference to FIG. 8 as regards the user interaction with the map display. When the map area being displayed also includes the point corresponding to the current position and the user touches that point, the personal navigation device 10 will acquire that current position and will use it from that moment onwards to calculate its own position at the next instants.

In order to avoid the need for a connection to the server of the GSV system, it is conceivable that every time the Internet is accessible and said server is reachable, the personal navigation device 10 automatically acquires "in background", during the normal operation or in stand-by mode, the explorable images of the areas surrounding the last destinations entered, the last positions known before turning off the device, the last PoI's selected by the user, and in general any area or region that may be used to manually enter the current position. In addition, it may be provided that the user can deactivate this automatic download of explorable images, if the rate plan is unfavorable (e.g. based on time or traffic) because too costly. Furthermore, the user can be allowed to explicitly indicate geographic areas or regions for which he/she wants the images of the GSV system to be made available. To avoid excessive memory occupation, it is conceivable that the oldest data are automatically replaced by the newest data and/or the user may be allowed to decide which explorable images should be kept or deleted.

The GSV system may be unavailable because the personal navigation device 10 does not have access to a connection network and to the server thereof, the local memory 125 does not contain the necessary data, or the system does not contain explorable images of the area that includes the presumed current position manually entered by the user. In such a case, or anyway regardless of the availability of GSV images, the personal navigation device 10 may be equipped with a detection unit (not shown in FIG. 1) that allows the user to carry out in-field surveys by exploiting one or more reference points displayed on the map and found by the user in the surrounding area. Since the reference points have positions known to the personal navigation device 10, the latter can obtain its own current position with rather high accuracy, without the user being required to enter the geographic coordinates of the place where he/she is, which are normally unknown to him/her. Said detection unit uses the optional presence of a device for generating (emitter diode) and receiving (receiver diode) a laser beam or another strongly directive electromagnetic radiation, which allows detecting the distance of the personal navigation device 10 from a geographic object the position of which is known, so that it can calculate its own position relative to the latter.

These pointing device are known and are largely used in various technical fields for measuring distances, e.g. distance meters used by architects and civil engineers for detecting architectural or geological environments. Typically they measure the flight time of trains of laser pulses emitted by the generator diode, which are reflected by the object the distance of which must be measured, until they are received by the receiver diode built in the device.

Figure 17:
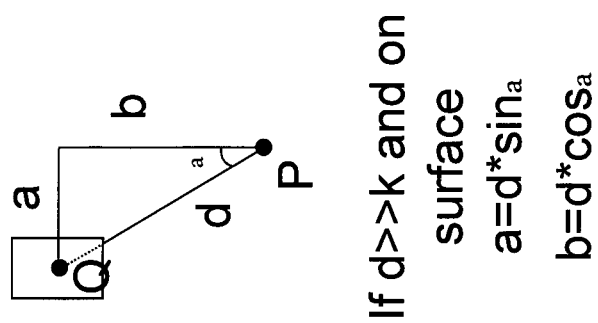
FIG. 17 illustrates a method for calculating some distances shown in FIG. 16.
Figure 16:
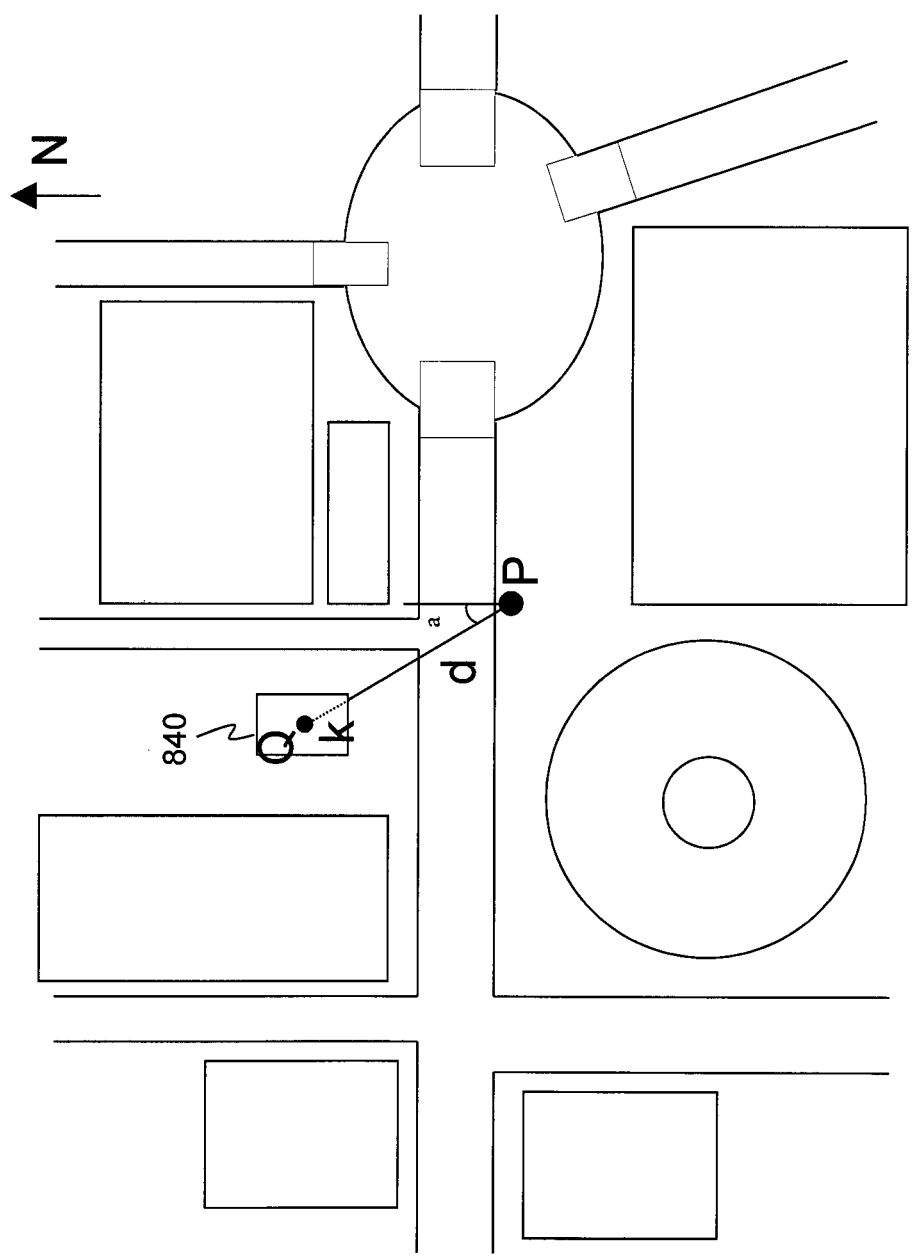
FIG. 16 schematically shows the position of the device of FIG. 1 on a map with respect to a predetermined reference point.

The principle on which their use for the purposes of the present invention is based is shown schematically in FIGS. 16 and 17.

Suppose that the personal navigation device 10 is in the unknown point P on the map, and that the user can locate a geographic object 840, which may be a building, as in the example shown herein, or a monument, a square, a PoI, or anyway any entity shown on the map 127, whose position is known by the personal navigation device 10 and which can be recognized by the user in the actual scenery. If the error k due to the non-null dimensions of the geographic object 840 is sufficiently smaller than the distance d that separates P from its centre of gravity Q whose position is known, and the terrestrial surface can be assimilated to a plane, then it is possible to calculate with known trigonometric formulae, by knowing the distance d and the angle $\alpha$ formed by a segment PQ with any known direction, e.g. the north-south direction of the terrestrial meridian passing through the point P, the lengths of the segments a and b that represent the difference of the coordinates of the point P and of the centre of gravity Q in terms of longitude and latitude, respectively (see FIG. 17).

Therefore, if the personal navigation device 10 is equipped with means that allow the user to locate the geographic object 840 and hence, automatically, the position thereof stored in the personal navigation device 10, which corresponds to the coordinates of the centre of gravity Q, as well as to autonomously measure the distance d and the angle $\alpha$, it can automatically calculate the unknown position P without the user being required to directly enter any numerical value relating to geographic coordinates of points or to distances or angles.

Figure 11:
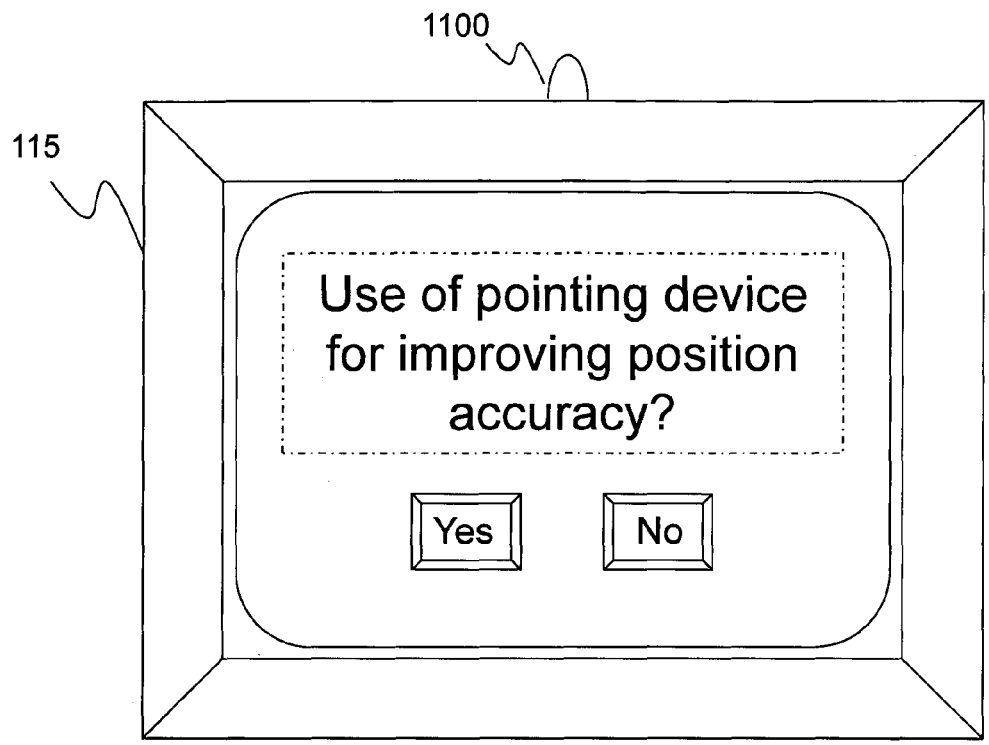

This facilitated entry procedure can be carried out as follows. First of all the user is given the possibility of using the optional pointing system, if so he/she desires; this usually occurs when the user has visibly located and recognized a geographic entity at a distance within reach of the laser pointing device associated with the personal navigation device 10. FIG. 11 shows a possible screenshot that prompts to use said pointing device. This option may be given, for example, at the end of the manual entry procedure, or the user may request it at any time as soon as he/she has recognized the object that he/she wants to use as a reference for manually entering the current position of the personal navigation device 10.

At this point, the personal navigation device 10 asks the user to provide the identifier of the reference object: this may be, for example, a PoI (monument or famous place) stored in the memory 125 of the personal navigation device 10 or the address or crossing located with the help of passers-by or by looking at indications and road signs present in the area where the user and his/her personal navigation device 10 are. The point P may also consist of any entity shown on the map, even if it cannot be recognized as a point of interest, and can be selected by the user, for example, by touching the screen 115 in the place corresponding to the identified geographic object. For example, it may be a square, a crossing, a building, a house number, and the like. From the touch position, the knowing of the map being displayed at the moment, and the zoom level thereof, and hence the active display scale, the personal navigation device 10 can derive the geographic position corresponding to the contact point of the touch.

Figure 12:
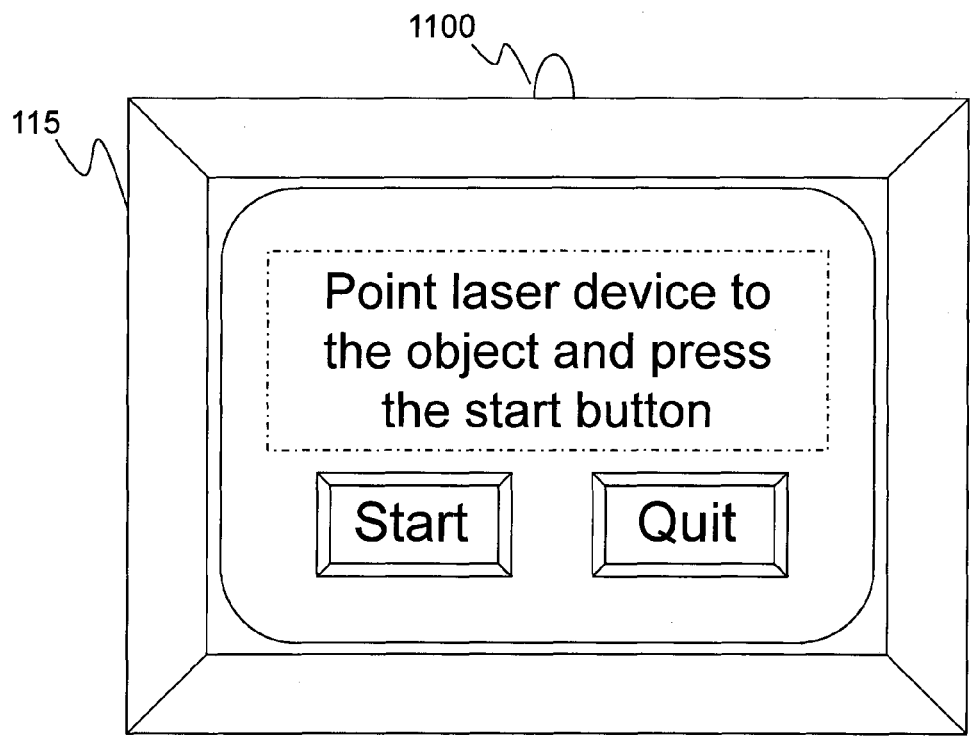

Once the reference geographic object 840 has been selected, the personal navigation device 10 prompts the user to point the laser pointing device towards that object, e.g. by displaying an appropriate message on the screen of the display 115. The pointing device 1100 may advantageously be incorporated into the display 115 itself, as shown by way of example in FIGS. 11 and 12 for a personal navigation device 10 for pedestrian or cycling (bicycle or motorcycle) use or for a portable one; in the case of a personal navigation device 10 associated with a vehicle, it may be incorporated into the car and associated with the personal navigation device 10 through a wired or wireless connection. In this second case, commands and data can travel over the existing connection between the two devices, and the user must take care to place him/herself in a point along the line connecting the beam emission point to the geographic object 840 being pointed to, so as to not affect the measurement of the angle α. Furthermore, the user must position him/herself as close as possible to the position of the PND, so as to avoid introducing errors into the calculation of the distance PQ between the device PND in the point P and the reference object in the point Q. To avoid these two requirements, the PND may possibly be equipped with means adapted to measure the angle formed by the conjunction line joining the PND and the removable laser pointer with a predetermined known position (e.g. the direction of the geographic terrestrial north pole) and to measure the distance that separates them by measuring the direction and flight time of the electromagnetic rays exchanged for the associated wireless connection. The pointing device 1100 may be secured to a part of the vehicle, and the beam pointing direction may be controlled remotely by the control unit of the personal navigation device 10. The generated laser beam is visible to the naked eye, so that the user can see where the beam is directed and can point it towards the geographic object 840, the distance from which must be measured.

Suppose, for example, that the user is prompted to point the pointing device 1100 by the screen shown in FIG. 11. The user confirms that he/she wants to do so by pressing the virtual key "Yes" 1110, then points the pointing device 1100 towards the reference object 840, and finally presses the virtual key "Start" 1120 of FIG. 12. As a confirmation that the distance Q from the point P has been read successfully, the personal navigation device 10 may display on the screen 115 the name of the object or the value of the distance detected. The user can either confirm, if he/she considers the value to be plausible, or repeat the detection until a credible distance value is obtained.

Figure 13:
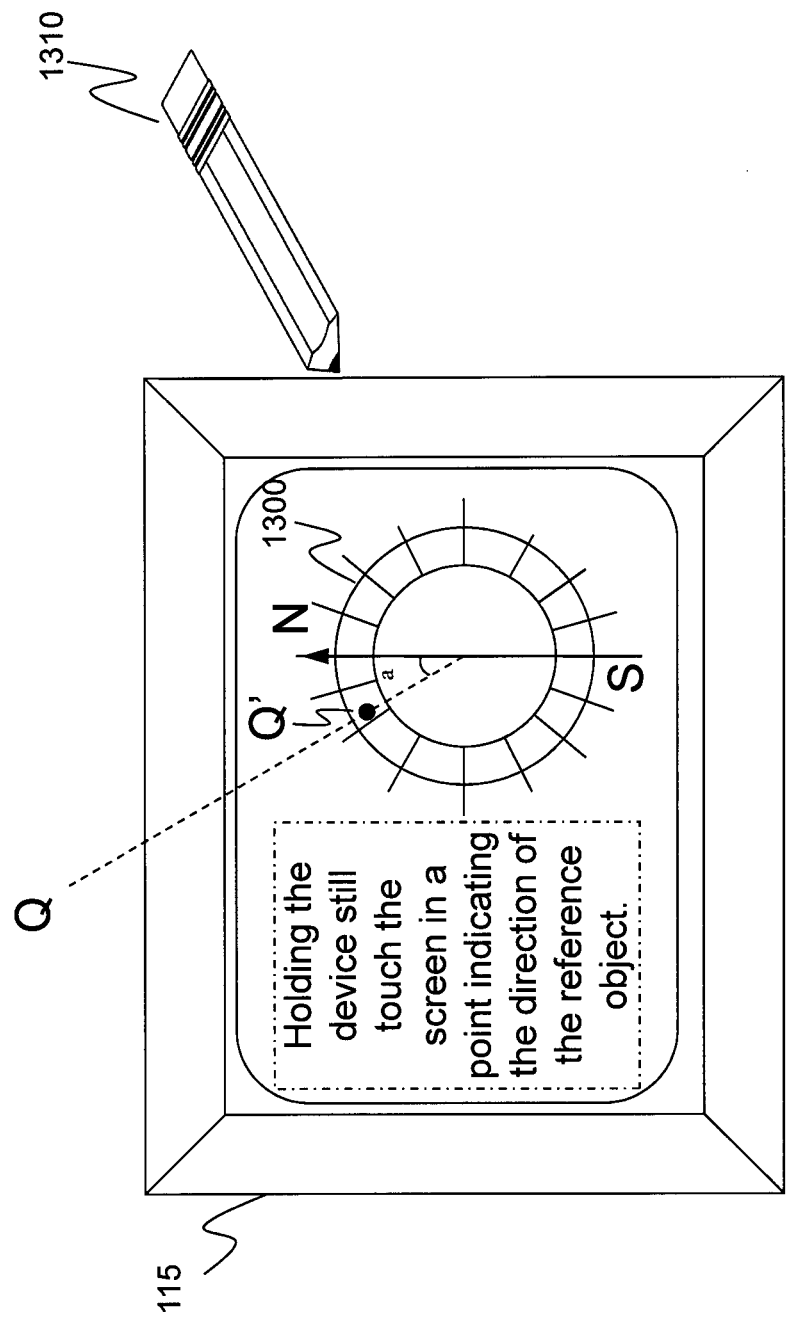

At this point, the user can enter the size of the angle α relative to a predefined direction. For simplicity, one may choose, as a reference direction, the one of the terrestrial meridian passing through the personal navigation device 10: if the latter incorporates a magnetic compass, e.g. an integrated digital compass using microelectronic technology, this direction is known with great precision also thanks to the updateable magnetic declination correction system, already described herein. The display 115 of the personal navigation device 10 may show, for user comfort, a virtual magnetic quadrant indicating the direction of the North pole: the user is prompted to touch the screen 115 on the virtual quadrant, consisting of a circular crown 1300, in a point corresponding to the direction of the point S where the geographic object 840 is located, as shown in FIG. 13, where it is assumed, for simplicity, that the direction of the terrestrial meridian coincides with the vertical axis of the page. If the user, by using a finger or, preferably, a pencil or another pointed object 1310, touches the circular crown 1300 in the point S', the size of the angle α is automatically measured and the personal navigation device 10 can then calculate the coordinates, and hence the position, of the point P by knowing the point Q and the size of the angle α.

Figure 14:
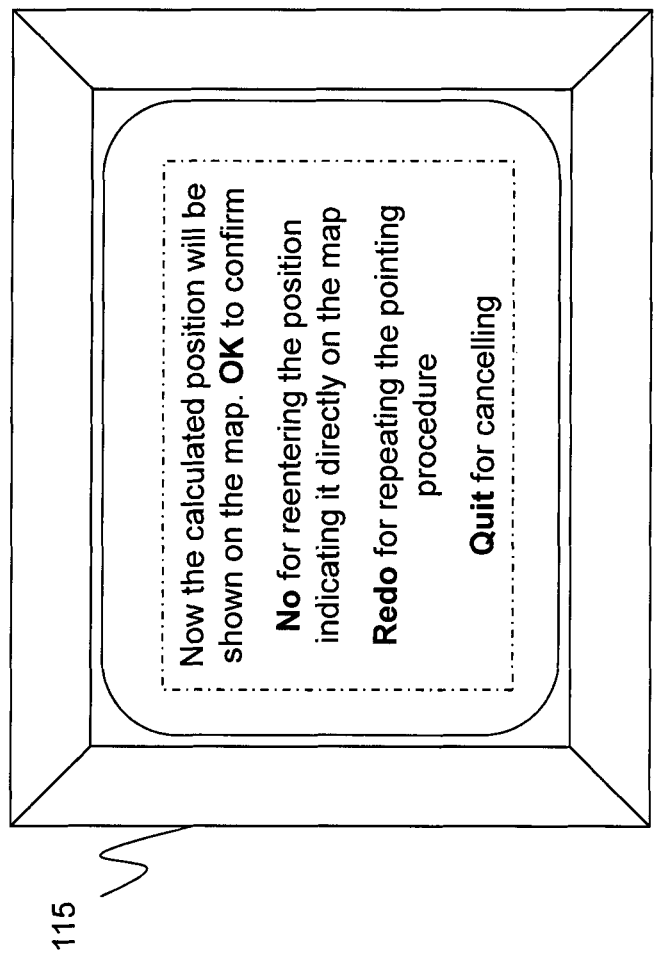
Figure 15:
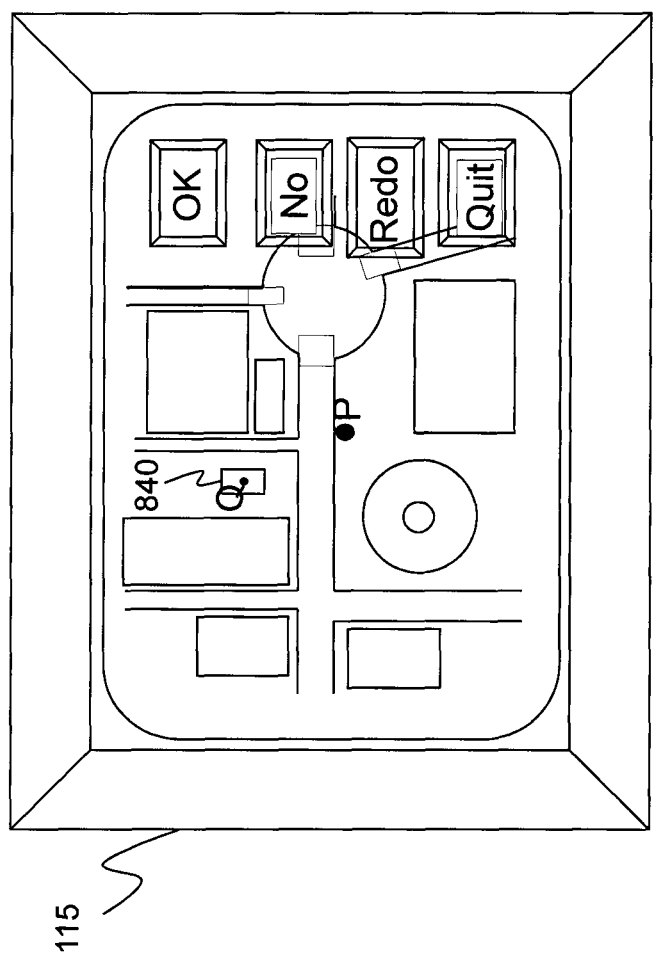

With reference to FIG. 14, the personal navigation device 10 may show on the display 115 a message that announces the next map representation indicating the position of the points P and S and the surrounding area at a predetermined zoom level dependent on the distance d measured during the detection carried out with the pointing device 1100. In this representation (FIG. 15), the user may be given the possibility to confirm the result of the operation and terminate it or to repeat it. If the personal navigation device 10 includes a compass, it may indicate the direction in which the reference point S should be found when the user rotates the personal navigation device 10 or the display 115, if the latter is separated from the base, so that the user can check in real time the correctness of its position. In addition, the user may be given the possibility of manually entering the position of the point P, by indicating it directly on the map display by touching the point corresponding to the current position of the personal navigation device 10, or of cancelling the operation.

In order to facilitate the operation of the magnetic compass integrated into the display 115, which is also the data and command input unit, a personal navigation device 10 for vehicular use may be equipped with a display that can be removed from the vehicle with which it is associated, so as to allow the user to hold it in his/her hand in a suitable position for making detections with the pointing device 1100 and for measuring the terrestrial magnetic field. The communications between the fixed part integrated into the vehicle and the removable part including the display and control unit 115 can take place by means of a connection bus operating in wired or, preferably, wireless mode (Bluetooth, ZigBee, Wi-Fi Direct, ad-hoc WLAN, and the like) to ensure the utmost comfort of use.

At this point, if any GSV images are available for the area being displayed on the map, the personal navigation device 10 can show on the screen 115 the images corresponding to the views actually visible to the user from the point P according to an interactive mode which is very effective, especially if the personal navigation device 10 is a portable or removable one.

According to such interactive mode, the personal navigation device 10 sends to the system of the GSV server the data relating to the position P and acquires from the magnetic compass the direction in which the user is pointing, at a certain instant, the personal navigation device 10 or the display 115 that incorporates the integrated magnetic compass. The server of the GSV system sends in real time the image/view corresponding to the pair of current viewpoint/pointing direction values received from the device 10, which then displays it on the screen. The user can thus verify if what he/she is seeing in a certain direction corresponds to the images available for that position by pointing in the same direction. If there is a strong correlation between the images displayed by the personal navigation device 10 and those actually visible, the user can be reasonably sure that he/she is in the manually entered position. If not, he/she can get information useful for obtaining the correct current position by starting from the one entered manually, based on the differences found between the GSV images and the "actual" views.

The current position entry procedure that uses the pointing device 1100 may also be carried out by utilizing multiple geographic objects in the area where the personal navigation device 10 and the user are located, without having to enter any angular measures, which might be an uncomfortable or undesired task for some of them. In such a case, the user is asked if he/she can identify multiple geographic objects in the area where he/she stands, in addition to the first one, by using the same procedure already described with reference to the geographic object 840 having a centre of gravity Q in a known position, excluding however the step of entering the angle α.

Figure 18:
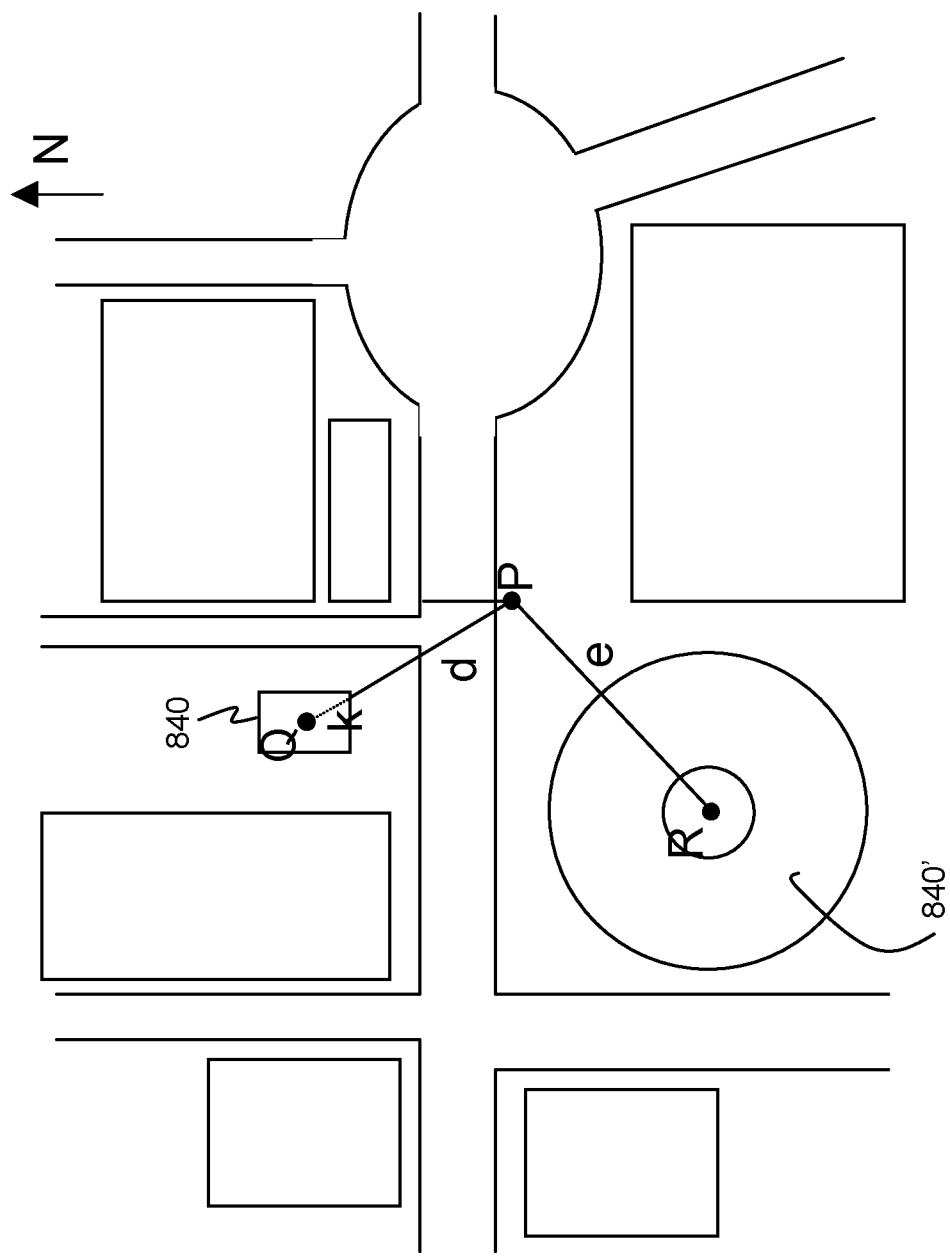
FIG. 18 schematically shows the position of the device of FIG. 1 with respect to two predetermined reference points.
Figure 19:
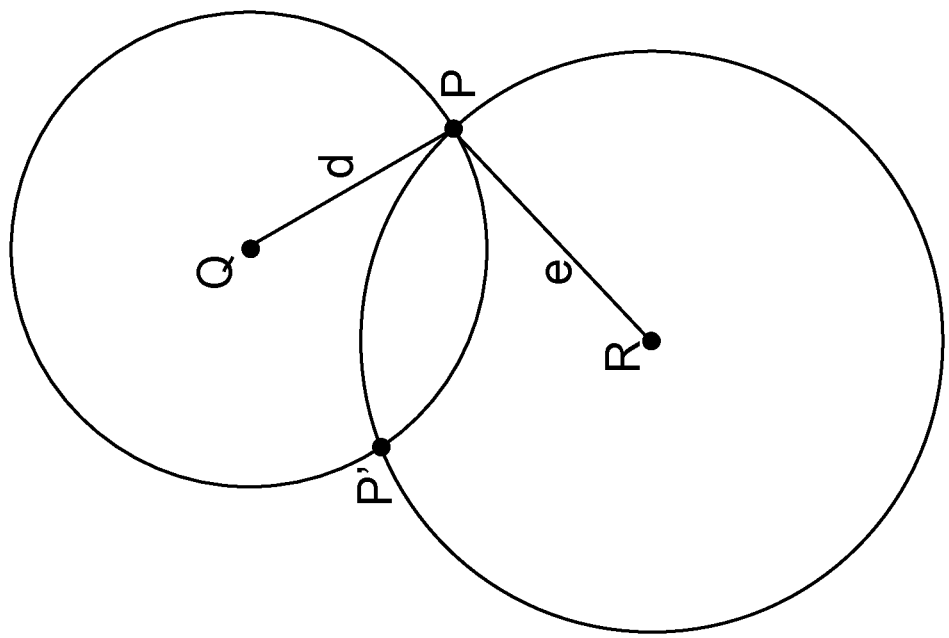
FIG. 19 shows a method for calculating the positions of some points present in FIG. 18.

FIG. 18 illustrates an example of two geographic objects 840,840' located at a distance within sight of the user of the personal navigation device 10 and within reach of the pointing device 1100. The geometric theory underlying the calculation of the unknown position of the current position P by starting from the known positions of the centers of gravity Q and R is shown in FIG. 19. Knowing the positions of the centers of gravity Q and R and the values of their distances d and e from the unknown position P, acquired through the pointing device 1100, there are two possible solutions referred to as P and P', which result from the intersection of the two circles having their centers in Q and R and respective radii d and e. The personal navigation device 10 may at this point carry out several verifications, either as an alternative or in addition, to establish which one of the two resulting points corresponds to the current position of the personal navigation device 10.

A first operation that the personal navigation device 10 may carry out is to correlate the two positions P and Q with the map information and with the type of device 10 in use (vehicular, pedestrian, portable or for cycling applications). If, for example, the point P' is located inside a building and the personal navigation device 10 is of the vehicular type, it is likely that the position P' is the one that must be discarded.

A second type of operation is to correlate the information about the points P and Q with other auxiliary localization data coming from auxiliary instruments, such as the altimeter, with the information about the radio mobile cell to which the personal navigation device 10 is connected, and with any positions recently occupied by the personal navigation device 10.

As a third and last possibility, the personal navigation device 10 may ask the user which position is the right one, possibly by displaying on the screen of the display 115 the available information about the points P and Q, e.g. by showing their positions on the map and highlighting all the references of the geographic objects around the two points, for the purpose of giving the user some indications helping him/her to make a choice. Such references may include toponyms, street names and numbers, place names, PoI's and the like, and even the distances between them and the points involved.

Any available and accessible images provided by the GAV system and taken from the two points P and Q in the current orientation direction of the personal navigation device 10 may possibly be displayed, so as to supply reference images based on which the user can make the right decision.

Of course, the procedure can be extended to the three-point case: by knowing the positions of three points and their distances from a point in an unknown position it is possible to calculate said unknown position by making the intersection of the three circles whose radii are said three distances and whose centers are the three points in known positions. In this case, the solution requires that a further reference geographic object be located and entered, but offers the advantage that it provides a univocal result as regards the unknown position P. This extension can be easily derived from the description already provided, and will not therefore be explained any further.

Figure 20:
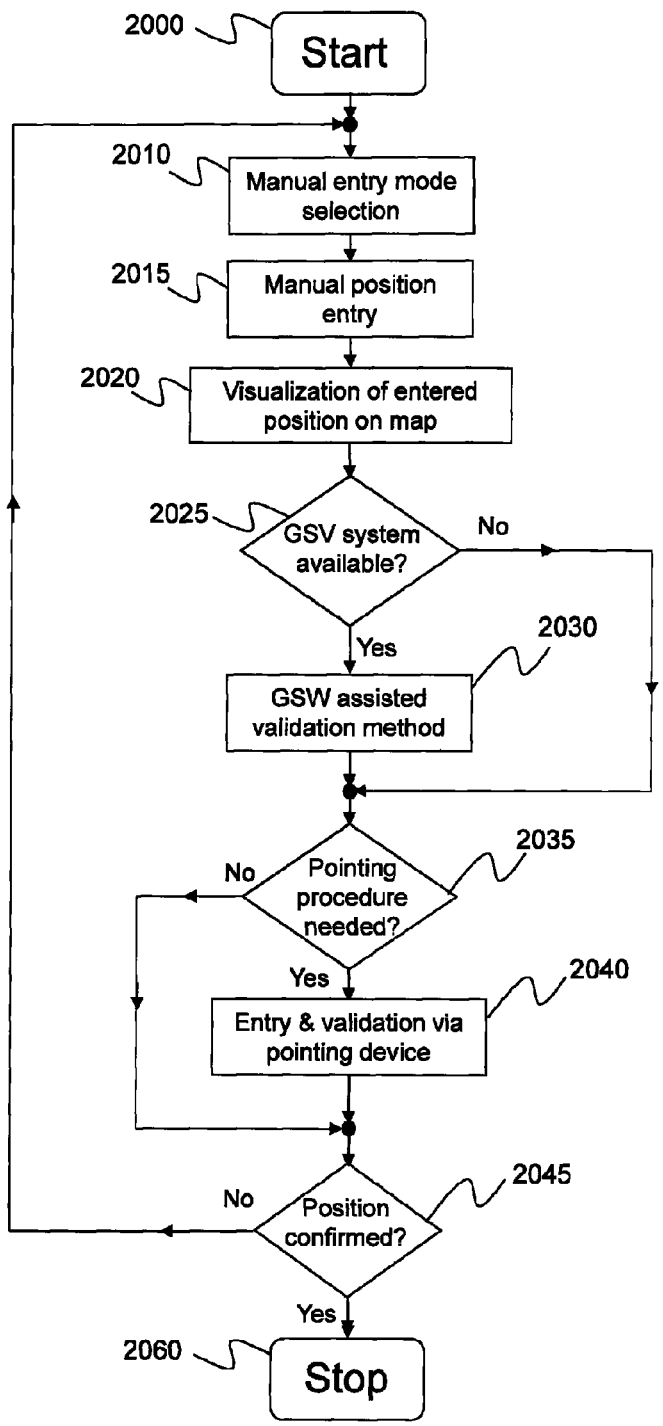
FIG. 20 shows a flow chart relating to a manual entry of the position into the device of FIG. 1.

FIG. 20 schematically shows by way of example a flow chart of the method for manually entering the current position according to the present invention, the various steps of which have already been described in detail. At step 2000, the procedure is started when the predetermined conditions that make it necessary occur. At step 2010, the user is asked to specify the preferred mode for manually entering the current position of the personal navigation device 10. Following this selection, the device 10 will acquire said position in the mode just selected (step 2015). When the acquisition is complete, at step 2020 the personal navigation device 10 displays on the screen of the display 115 a map area containing the point corresponding to the current position just entered.

It is then verified if there are any explorable images of the GSV system or of other equivalent geographic database services (step 2025). If there are, the user is informed about the availability of such images for the area of interest and, if the user agrees, the GSV-assisted validation procedure is started (step 2030); if the user does not agree, or if the GSV system is unavailable, step 2035 is carried out, wherein the personal navigation device 10 verifies the possibility or necessity of entering the current position through the pointing device 1100. This procedure can only be executed if the personal navigation device 10 is equipped with such a device and if for example, the previous entry modes gave results considered to be inappropriate by the user. If the result of the verification of step 2035 is affirmative, the personal navigation device 10 carries out the procedure for manually entering the current position through the pointing device 1100 (step 2040); otherwise, in the negative case, it goes directly to the next step 2045, wherein the system asks for a final confirmation of the manually entered position. If a confirmation is given, the procedure will end; otherwise, it will return to step 2010.

Of course, FIG. 20 shows only one possible embodiment of the invention. Numerous variants and alternative embodiments are possible. For example, if it is equipped with a pointing device 1100, the personal navigation device 10 can already show at step 2010 the pointing device entry option among the possible current position entry modes, which is appropriate if the user has visually located any geographic object among those shown on the map 127.

As an alternative or in addition, if the GSV system is available it is possible to implement an iterative entry mode working by means of successive approximations: at the first step of each approximation, the user manually enters the current position in any selectable mode, then the explorable images for the point just entered, as acquired by the GSV system, are accessed and displayed and, if the result is unsatisfactory, the manual entry procedure will be repeated in the mode selected by the user for the next cycle. The resulting new point is then used as a new viewpoint for the explorable images acquired by the GSV system and, if the user is satisfied with the result, the procedure will end; otherwise, the procedure will go on until a satisfactory result is obtained or the user cancels the procedure.

The manual entry procedure of the present invention may turn out to be difficult to carry out for some users who do not want to use it or cannot use it for whatever reasons. It is therefore conceivable that the possibility of activating it is set by default at the factory to a certain predefined value, which may vary, for example, depending on sale market, type of personal navigation device 10 (tablet, smart phone, netbook, vehicular navigator, pedestrian navigator, cycling navigator) and depending on the category of users for which the personal navigation device 10 is intended. The user may also be given the possibility or not to change said factory setting, e.g. by inducing the personal navigation device 10 to always ask, whenever it is turned on, if the user wants to activate o deactivate the manual position entry ("Always ask" option), if he/she wants to leave it always active, but it can be manually deactivated afterwards ("Always on" option), or if he/she wants to deactivate it, but it can be manually activated afterwards ("Always off" option).

The personal navigation device 10 may be equipped with an on-line connection to the server of the GSV system, e.g. by providing it with an interface for access to the Wi-Fi or WLAN network through the radio interface 180 and/or the GPRS/UMTS/LTE radio mobile terminal 190. In this way, the personal navigation device 10 will always be potentially capable of acquiring the GSV system's explorable images of the area where it is located and towards which it is moving, in any current position calculation condition, whether through the satellite signal reception module 105 or non-GNSS-dependent tools. In such a case, it is conceivable that the user can at any instant switch between the map display showing the current position and the visualization of the GSV system's explorable images corresponding to the current position in a direction that may be, for example:

by default, the one in which the vehicle or the holder of the personal navigation device 10 is moving, as detected through the satellite signal reception module 100 or through the inertial navigation module 105;
  modifiable at will by the user by using virtual arrow keys displayed on the screen of the display 115 as already described with reference to FIG. 10. In this manner the user has the possibility to verify, during the journey, that what surrounds the point where he/she actually is corresponds to what "should" surround the position indicated by the personal navigation device 10. If there are any discrepancies, the user can immediately understand if the personal navigation device 10 is not operating properly. Furthermore, if the actual current position coincides with the one calculated by the personal navigation device 10 and used as a viewpoint for the GSV images, the user can "rotate" his/her view to see in directions which are not or scarcely visible when he/she is in a moving vehicle, without having to stop to look or to make dangerous body movements.

In an alternative embodiment of the present invention, if the personal navigation device 10 is equipped with a built-in camera or can acquire still or moving images through any wired or wireless connection interface, it can acquire one or more images from the unknown current position. This set of images are then sent to the GSV system, which will scan its own archive and, through a visual simulation algorithm, will search for images having high correlation with those received. In order to reduce the search time and increase the probability of success, the user may be invited to provide indications about the area where he/she is (e.g. country, region or province, town, street, place), which he/she certainly knows. The personal navigation device 10 may automatically try to acquire at least a part of this information based on the knowledge of the radio mobile cell in which the personal navigation device 10 is, if it has access to such a network. If the search is successful, the GSV system will send to the personal navigation device 10 the most probable coordinates corresponding to the viewpoint from which the image was taken.

In the description of the present invention, reference has been made to the geographic image storage system called Google Street View. Such a reference is purely exemplificative and has no limiting value, in that one can use, for the purposes of the present invention, any archive remotely accessible and containing real images of scenes that can be seen by the user of a personal navigation device 10 and compared in order to verify the calculated or user-defined position with respect to the actual current position. The personal navigation device 10 of the present invention can be implemented in many variegated forms through a suitable combination of hardware and software means adapted to implement the inventive concept thereof. Therefore, said personal navigation device 10 may be implemented as a PC, a tablet, a net book, a smart phone, a navigator, and the like. It may be intended for any use, from making journeys on vehicles (car, motorcycle or bicycle) to on-foot excursions, or for both applications, when the device 10 is portable and associable with vehicles through suitable mechanical coupling means or through means of another type.

The features of the present invention, as well as the advantages thereof, are apparent from the above description.

A first advantage of the method according to the present invention is that it allows to completely eliminate the wait necessary for calculating the position of a portable navigation device through fixing of satellite signals when the same device is turned on after a long period of inactivity.

A second advantage of the method according to the present invention is that it avoids the necessity of bringing the portable navigation device into an open place in order to be able to calculate one's position through satellite signals.

A further advantage of the method according to the present invention is that it allows a portable navigation device to calculate its own position with a reduced drift error.

Yet another advantage of the method according to the present invention is that it allows correcting the position of a portable navigation device "on the fly", if the user finds it to be incorrect based on his/her own observations.

The method for ensuring continuity of service of a personal navigation device and the associated device described herein by way of example may be subject to many possible variations without departing from the novelty spirit of the inventive idea; it is also clear that in the practical implementation of the invention the illustrated details may have different shapes or be replaced with other technically equivalent elements.

It can therefore be easily understood that the present invention is not limited to a method for ensuring continuity of service of a personal navigation device and to the associated device, but may be subject to many modifications, improvements or replacements of equivalent parts and elements without departing from the inventive idea, as clearly specified in the following claims.

The invention claimed is:

1. A personal navigation device for ensuring continuity of service in an event of insufficient reception of GNSS satellite signals, the device comprising:
   data input means for receiving first data from a user relating to a position of the personal navigation device; and
   a microprocessor connected to the data input means and associated with localization tools that generate second data related to the position of the personal navigation device, wherein the microprocessor uses the first data and the second data to calculate the position of the personal navigation device without using GNSS satellite signals.

2. The personal navigation device according to claim 1, wherein the data input means receives the first data from the user in an interactive manner by using information and commands made available by said portable navigation device to the user.

3. The personal navigation device according to claim 1, wherein, in the event that the current position of the device cannot be derived by the microprocessor or can only be determined by the microprocessor with an error above a maximum allowable value, said device automatically prompts the user to supply said first data using the data input means.

4. The personal navigation device according to claim 1, wherein, in the event that the current position of the device cannot be derived by the microprocessor or can only be determined by the microprocessor with an error above a maximum allowable value for a time interval longer than a predetermined value, said device automatically prompts the user to supply said first data using the data input means.

5. The personal navigation device according to claim 1, wherein said localization tools comprise an inertial system which uses said first data as an initial position to calculate subsequent instantaneous positions of said personal navigation device.

6. The personal navigation device according to claim 1, further comprising a memory, wherein said first data comprise at least one of the following items:
   an address of a place which is a starting point or a destination point of a route previously stored in the memory of the device;
   a point of interest stored in the memory of the device;
   a position recently obtained by the device through GNSS satellite signals;
   a geographic point stored in the memory of the device and previously selected by the user;
   a geographic place or address interactively selectable by the user based on a map stored in the memory of the device;
   a point on the map which can be displayed on a display of the device and which is selectable by the user.

7. The personal navigation device according to claim 1, further comprising a memory and a display having a screen, wherein, when said first data is to be received by the data input means, the data input means gives the user, in an interactively selectable manner, information stored in the memory that can be displayed graphically on the screen of the display, said information relating to at least one of the following items:
   a last position known by the device;
   at least one of the last destinations reached by the device;
   a point of interest for the user;
   at least one of the destinations previously entered by the user;
   a geographic point previously selected by the user to be then directly recalled;
   a direction of a terrestrial meridian in the current position;
   an area of a map stored in the memory of the device and displayed on the screen of a display for selecting through a touch-screen display a geographic point comprised in said area.

8. The personal navigation device according to claim 1, wherein said second data comprise at least one of the following items:
   a direction of the terrestrial magnetic field in the current position;
   an elevation of the current position from sea level;
   a direction and an intensity of an instantaneous speed of the device or of a vehicle moving at the same speed;
   a space travelled by the device or by a vehicle which has travelled the same space as the device.

9. The personal navigation device according to claim 1, further comprising a GNSS localization module, wherein, if an accuracy with which the current position and/or at least one of other physical quantities associated with the calculation of said position by the GNSS localization module is greater than a predetermined threshold, then at least one of said localization tools acquires the value of a physical quantity measured by it or associated therewith and, in an event that there is a discrepancy greater than a predetermined tolerance level between said acquired value and the value obtained by using the current position calculated through said GNSS localization module, then a calibration or correction value is calculated and stored which will be applied to the subsequent measurements taken by said at least one of said localization tools on the basis of said discrepancy or said current position and/or said at least one other physical quantity.

10. The personal navigation device according to claim 1, wherein said device can remotely gain access to a system for storing explorable geographic images taken from known positions, and wherein, upon receiving a command from the user, a display of the device displays explorable images supplied by said storage system which are taken from positions located at a distance shorter than a preset value from the current position defined by said first data.

11. The personal navigation device according to claim 10, wherein a direction of spatial orientation of the device is detected, wherein the directions in which said explorable images were taken are known, and wherein said display displays explorable images taken in different directions depending on the detected spatial orientation of the device.

12. The personal navigation device according to claim 10, wherein the user is allowed to switch from a map display, which displays the area surrounding the estimated current position, and a display of explorable images, the shooting position of which is located at a distance shorter than said preset value with respect to said estimated current position.

13. The personal navigation device according to claim 1, wherein said first data comprise at least one distance from a geographic object obtained by activating a pointing device associated with said personal navigation device towards said geographic object.

14. The personal navigation device according to claim 13, wherein the data input unit receives said device data relating to the pointing direction from the user, so that, knowing an angle ($\alpha$) formed by said pointing direction with a predefined direction provided on the basis of a measurement taken by at least one of said localization tools and from a measurement of the distance (d) of said geographic object whose position is known, said device calculates its own current position.

15. A method for ensuring continuity of service in a personal navigation device in an event of insufficient reception of GNSS satellite signals, the method comprising:
   acquiring a position of the personal navigation device manually from first data received through data input means for receiving the first data;
   acquiring second data from localization tools configured to generate the second data, wherein the second data relates to the position of the personal navigation device; and
   determining the position of the personal navigation device with a microprocessor that is connected to the data input means and the localization tools based on the first data and the second data and without using GNSS satellite signals.

16. The method according to claim 15, further comprising automatically prompting a user for the first data when the current position of the device cannot be derived or can only be determined with an error above a maximum allowable value.

17. The method according to claim 15, further comprising the localization tools using an inertial system which uses said first data as an initial position to calculate subsequent positions of said personal navigation device.

18. The method according to claim 15, wherein the personal navigation device includes a memory, further comprising receiving at least one of the following as the first data into the data input means:
   an address of a place which is a starting point or a destination point of a route previously stored in the memory of the device;
   a point of interest stored in the memory of the device;
   a position recently obtained by the device through GNSS satellite signals;
   a geographic point stored in the memory of the device and previously selected by the user;
   a geographic place or address interactively selectable by the user based on a map stored in the memory of the device;
   a point on the map which can be displayed on a display of the device and which is selectable by the user.

19. The method according to claim 15, further comprising displaying information in an interactively selectable manner, the information relating to at least one of:
   a last position known by the device;
   at least one of the last destinations reached by the device;
   a point of interest for the user;
   at least one of the destinations previously entered by the user;
   a geographic point previously selected by the user to be then directly recalled;
   a direction of a terrestrial meridian in the current position;
   an area of a map stored in the memory of the device and displayed on the screen of a display for selecting through a touch-screen display a geographic point comprised in said area.

20. The method according to claim 15, further comprising receiving the first data in an interactive manner using commands and information that are presented on a display of the personal navigation device.

* * * * *